(12) United States Patent
Furushima et al.

(10) Patent No.: US 8,308,622 B2
(45) Date of Patent: Nov. 13, 2012

(54) CENTRIFUGALLY CAST COMPOSIT ROLL

(75) Inventors: Kiyoshi Furushima, Kitakyushu (JP); Shunji Matsumoto, Kitakyushu (JP); Ryota Honda, Kitakyushu (JP); Kiyoshi Hayashi, Kitakyushu (JP); Takashi Honda, Kitakyushu (JP); Masatsugu Uchida, Kitakyushu (JP); Seiji Oyama, Kitakyushu (JP); Takuya Osue, Kitakyushu (JP)

(73) Assignee: Hitachi Metals, Ltd., Tokyo (JP)

( * ) Notice: Subject to any disclaimer, the term of this patent is extended or adjusted under 35 U.S.C. 154(b) by 1166 days.

(21) Appl. No.: 12/097,953

(22) PCT Filed: Mar. 13, 2006

(86) PCT No.: PCT/JP2006/304932
§ 371 (c)(1),
(2), (4) Date: Jun. 18, 2008

(87) PCT Pub. No.: WO2007/077637
PCT Pub. Date: Jul. 12, 2007

(65) Prior Publication Data
US 2009/0092852 A1   Apr. 9, 2009

(30) Foreign Application Priority Data

| Dec. 28, 2005 | (JP) | 2005-377624 |
| Dec. 28, 2005 | (JP) | 2005-377625 |
| Dec. 28, 2005 | (JP) | 2005-377626 |
| Dec. 28, 2005 | (JP) | 2005-377627 |
| Dec. 28, 2005 | (JP) | 2005-377628 |
| Jan. 12, 2006 | (JP) | 2006-005020 |

(51) Int. Cl.
*F16C 13/00* (2006.01)
*B32B 15/18* (2006.01)

(52) U.S. Cl. ........ 492/54; 492/48; 428/656; 428/681; 428/683; 428/685

(58) Field of Classification Search .......... 492/48, 492/54; 428/656, 681, 683, 685
See application file for complete search history.

(56) References Cited

U.S. PATENT DOCUMENTS

| 4,958,422 A * | 9/1990 | Oshima et al. .......... 492/54 |
| 5,225,007 A * | 7/1993 | Hattori et al. .......... 492/58 |
| 5,305,522 A * | 4/1994 | Nawata et al. ......... 492/54 |
| 5,316,596 A   | 5/1994 | Kataoka |
| 5,355,932 A * | 10/1994 | Nawata et al. ......... 164/95 |
| 5,419,973 A * | 5/1995 | Hashimoto et al. ..... 428/683 |

(Continued)

FOREIGN PATENT DOCUMENTS

EP   0559899 A1   9/1993

(Continued)

OTHER PUBLICATIONS

Machine translation of JP 2005/169422, Jun. 2005.*

(Continued)

*Primary Examiner* — Helene Klemanski
(74) *Attorney, Agent, or Firm* — Sughrue Mion, PLLC

(57) ABSTRACT

A centrifugally cast composite roll comprising an outer layer having a composition comprising by mass 2.5-9% of C, 0.1-3.5% of Si, 0.1-3.5% of Mn, and 11-40% of V, the balance being Fe and inevitable impurities; an intermediate layer made of a high-speed steel alloy, which is formed inside the outer layer; and an inner layer made of cast iron or steel, which is formed inside the intermediate layer.

12 Claims, 14 Drawing Sheets

U.S. PATENT DOCUMENTS

| | | | |
|---|---|---|---|
| 5,484,372 A * | 1/1996 | Nawata et al. | 492/58 |
| 5,514,065 A * | 5/1996 | Noda et al. | 492/54 |
| 5,674,171 A * | 10/1997 | Ichino et al. | 492/54 |
| 5,738,734 A * | 4/1998 | Sawa et al. | 148/324 |
| 5,839,495 A * | 11/1998 | Ichino et al. | 492/54 |
| 6,095,957 A * | 8/2000 | Ichino et al. | 492/54 |
| 2008/0226936 A1 | 9/2008 | Furushima et al. | |

FOREIGN PATENT DOCUMENTS

| | | |
|---|---|---|
| EP | 1832665 A1 | 9/2007 |
| JP | 03-254304 A | 11/1991 |
| JP | 04-141553 A | 5/1992 |
| JP | 05001352 | 1/1993 |
| JP | 06-335712 A | 12/1994 |
| JP | 06-346188 A | 12/1994 |
| JP | 08-060289 A | 3/1996 |
| JP | 08-081731 A | 3/1996 |
| JP | 09-209071 A | 8/1997 |
| JP | 09-256108 A | 9/1997 |
| JP | 2000-063976 A | 2/2000 |
| JP | 2000303136 | 10/2000 |
| JP | 2001-247928 A | 9/2001 |
| JP | 2005-169422 A | 6/2005 |
| JP | 2005-171285 A | 6/2005 |

OTHER PUBLICATIONS

European Search Report issued in Application No. 06728997.5 dated Feb. 12, 2012.

Notice of Reasons for Rejection, mailed Aug. 21, 2012, issued in the Korean Patent Office, in corresponding Korean Patent Application No. 10-2008-7018527, along with an English translation thereof.

* cited by examiner

○ Reference Example 1   Not-Concentrated Portion
● Reference Example 1   Concentrated Portion
□ Comparative Example 1  Not-Concentrated Portion
■ Comparative Example 1  Concentrated Portion
△ Conventional Example 2

(a)

(b)

(c)

CENTRIFUGALLY CAST COMPOSIT ROLL

CROSS REFERENCE TO RELATED APPLICATION

This application is a National Stage of International Application No. PCT/JP2006/304932 filed on Mar. 13, 2006, claiming priority based on Japanese Patent Application Nos. 2005-377624, 2005-377625, 2005-377626, 2005-377627 and 2005-377628, filed Dec. 28, 2005 and Japanese Patent Application No. 2006-005020, filed Jan. 12, 2006, the contents of all of which are incorporated herein by reference in their entirety.

FIELD OF THE INVENTION

The present invention relates to a centrifugally cast composite roll having excellent wear resistance, particularly to a centrifugally cast composite roll suitable for a work roll at a finishing train of a hot strip mill.

BACKGROUND OF THE INVENTION

The wear resistance and surface roughening resistance of a roll are important properties determining the productivity of rolling. Poor wear resistance causes a roll surface to be prematurely worn, resulting in rolled products with deteriorated dimensional precision. Also, when a roll surface is unevenly worn and roughened by contact with a work, a back-up roll, etc., such surface roughness is transferred to a work surface, resulting in a work with deteriorated appearance. To prevent these problems, the roll should be exchanged frequently, resulting in frequent stop of a rolling operation and thus decrease in the productivity of rolling factories, cost increase by the grinding of a roll surface, and the reduction of a roll life by the increased grinding of a roll surface.

Seizure resistance is also important for the roll. Poor seizure resistance causes a work to be seized with the roll by heat generated in the roll bite, etc. during rolling, failing to conduct normal rolling. Particularly in a downstream stand at a finishing train of a hot strip mill, overlapped or folded end portions of a work are rolled for some reasons, causing an accident called "overlapping." In this case, if the roll has poor seizure resistance, the work may be seized with the roll and wound around the roll body, inevitably stopping rolling. If rolling continues with the work seized with the roll, a rolling load is concentrated in a seized portion, generating cracks, from which spalling, etc. occurs to cause fracture.

In general, a harder roll has higher wear resistance. A high-speed steel roll material contains high-hardness carbides of alloying elements, such as MC, $M_2C$, $M_6C$, $M_7C_3$, etc. Among the alloying elements, particularly V and Nb form extremely hard MC carbides having Vickers hardness Hv of about 2400-3200, remarkably contributing to improvement in wear resistance. However, because MC carbides comprising V and Nb have relatively small specific gravities, when a melt containing large amounts of V and Nb is centrifugally cast, the MC carbide particles are centrifugally segregated inward.

JP8-60289A discloses a centrifugally cast, solid or hollow, composite roll comprising an outer layer having a composition comprising, by mass, 1.0-3.0% of C, 0.1-3.0% of Si, 0.1-2.0% of Mn, 2.0-10.0% of Cr, 0.1-10.0% of Mo, 1.0-10.0% of V, 0.1-10.0% of W, Mo+W≦10.0%, and the balance being Fe and impurities, and an inner layer of cast iron or steel. This reference describes that when V exceeds 10.0% by mass, light carbides are segregated toward an inner surface by centrifugal casting, with small amounts of carbides remaining at an outer surface of an outer layer to be used for rolling. This phenomenon tends to occur when MC carbides are primarily crystallized from a melt. Because primarily crystallized MC carbides have specific gravities of about 6 g/cm³, lighter than the melt having a specific gravity of about 7-8 g/cm³, they move toward an inner surface by a centrifugal force. This reference thus describes that MC carbides are segregated near boundaries with the inner layer, resulting in poor bonding strength between the outer layer and the inner layer.

To prevent segregation due to centrifugal separation, JP9-256108 A proposes a hot-rolling tool steel having carbides with larger specific gravities. This hot-rolling tool steel has a composition comprising by mass 3.5-5.5% of C, 0.1-1.5% of Si, 0.1-1.2% of Mn, 4.0-12.0% of Cr, 2.0-8.0% of Mo, and 12.0-18.0% of V, 8.0% or less of Nb, the balance being Fe and inevitable impurities. JP 9-256108 A describes that although VC having a small specific gravity is segregated by centrifugal casting, the addition of Nb in an amount satisfying the condition of 0.2≦Nb/V prevents the segregation of carbide by centrifugal separation because it forms composite carbide of (V, Nb)C having a large specific gravity. It has been found, however, that the addition of such a large amount of V together with a relatively large amount of Nb causes production problems such as insufficient melting, etc.

Further, the formation of an inner layer inside the outer layer containing such large amounts of alloy components causes insufficient melting problems such as voids between the outer layer and the inner layer, the segregation of carbides, etc., and the deterioration of the toughness of the inner layer due to the migration of large amounts of alloy components from the outer layer to the inner layer.

JP 9-209071 A discloses a composite roll for rolling, which comprises an outer layer made of high-speed cast steel comprising by weight 2.0-3.2% of C, 0.1-2.0% of Si, 0.1-2.0% of Mn, 3-10% of Cr, 2×Mo+W=5-22%, and 3-8% of V, the balance being substantially Fe; an intermediate layer integrally melt-bonded to an inner surface of the outer layer, which comprises 0.8-1.9% of C, 3.0% or less of Si, 2.0% or less of Mn, 6.0% or less of Cr, 5.0% or less of Mo, 5.0% or less of W, and 5.0% or less of V, the balance being substantially Fe; and an inner layer integrally melt-bonded to an inner surface of the intermediate layer, which is made of cast steel material comprising 0.2-0.8% of C, 0.2-3.0% of Si, 0.2-2.0% of Mn, 1.5% or less of Cr, 1.0% or less of Mo, 1.0% or less of W, and 1.5% or less of V, Cr+Mo≧0.3%, and the balance being substantially Fe. This composite roll for rolling has good melt-bonding between the outer layer and the intermediate layer, and between the intermediate layer and the inner layer, thereby avoiding the problem of insufficient melt-bonding in the production of a composite roll comprising an outer layer of a high-carbon material and an inner layer of a low-carbon material by centrifugal casting. Thus obtained is a high-quality, composite steel roll for rolling comprising an outer layer having predetermined wear resistance and an inner layer having predetermined toughness. It has been found, however, that the outer layer of this composite roll has insufficient wear resistance, because of too small amounts of C and V, 0.8-1.9% of C and 5.0% or less of V.

JP 2000-63976 A discloses a composite roll for rolling, which comprises an inner layer made of a structure steel material having excellent toughness is cast on an inner surface of an outer layer made of high-speed cast steel having excellent wear resistance, via an intermediate layer made of Adamite. Because pearlitic transformation occurs in the entire intermediate layer by a heat treatment after casting, there remains a large compression stress on the outer layer surface, suppressing thermal fatigue cracking during rolling and cracking during drawing accident. However, because the matrix of the high-speed steel outer layer is subjected to martensitic transformation and bainitic transformation by a hardening heat treatment step after casting, a radial, residual tensile stress is generated in the boundary between the intermediate layer subjected to pearlitic transformation and the outer layer. When the residual tensile stress of this boundary exceeds the material strength, the outer layer is likely to spall not only by a hardening step, but also by the fatigue of the boundary between the intermediate layer and the outer layer due to rolling stress.

JP 3-254304 A discloses a hot-rolling, composite roll comprising an outer layer having a structure comprising by area 5-30% of MC (granular) carbides and 5% or less of non-MC (non-granular) carbides, the matrix of the outer layer having Vickers hardness Hv of 550 or more. The outer layer in this hot-rolling, composite roll has a basic composition comprising 1.0-3.5% by mass of C, 3.0% or less by mass of Si, 1.5% or less by mass of Mn, 2-10% by mass of Cr, 9% or less by mass of Mo, 20% or less by mass of W, and 2-15% by mass of V, the balance being Fe and impurities. However, this composite roll is produced by a so-called continuous casting method, by which an outer layer is continuously formed around a steel shaft using a high-frequency coil. The continuous casting method suffers from a higher production cost than the centrifugal casting method, and is little adapted for producing a large roll.

JP 4-141553 A discloses a hot-rolling, composite roll comprising an outer layer formed around a steel shaft by a continuous casting method, the outer layer comprising by weight 1.0-4.0% of C, 3.0% or less of Si, 1.5% or less of Mn, 2-10% of Cr, 9% or less of Mo, 20% or less of W, 2-15% of V, 0.08% or less of P, 0.06% or less of S, and 500 ppm or more of B, the balance being Fe and impurity elements, and further comprising any one of 5.0% or less of Ni, 5.0% or less of Co, and 5.0% or less of Nb, and having a structure comprising 5-30% of MC carbide and 6% or more of non-MC carbide by an area ratio, the matrix of the outer layer having Vickers hardness (Hv) of 550 or more. It has been found, however, that when the amounts of V and Nb are increased to improve the wear resistance, primarily crystallized MC carbides float on an outer-layer-forming melt, so that they are unevenly contained in the formed outer layer, resulting in the segregation of carbides.

OBJECT OF THE INVENTION

Accordingly, an object of the present invention is to provide a centrifugally cast composite roll comprising an outer layer containing a large amount of uniformly dispersed MC carbide, thereby exhibiting excellent wear resistance, surface roughening resistance and seizure resistance, as well as excellent spalling resistance.

DISCLOSURE OF THE INVENTION

As a result of intense research in view of the above object, the inventors have found that (a) positively utilizing a phenomenon that when a melt having a composition forming primarily crystallized MC (granular) carbide is centrifugally cast, MC carbide having a small specific gravity is concentrated on the inner surface side, a roll outer layer containing a lot of MC carbide can surely be formed at a low cost without necessity of remarkably increasing the concentration of V in the melt, by cutting off an outer portion from a centrifugal cast roll outer layer to leave an inside portion of the layer in which MC carbide is concentrated, and (b) the formation of an intermediate layer made of a high-speed steel alloy between an outer layer containing a large amount of MC carbide and an inner layer made of cast iron or steel provides good melt-bonding between the outer layer and the inner layer, thereby reducing a radial, residual tensile stress in a bonding boundary to improve the spalling resistance of the outer layer. The present invention has been completed based on such findings.

Thus, the first centrifugally cast composite roll of the present invention comprises an outer layer having a composition comprising by mass 2.5-9% of C, 0.1-3.5% of Si, 0.1-3.5% of Mn, and 11-40% of V, the balance being Fe and inevitable impurities; an intermediate layer made of a high-speed steel alloy, which is formed inside the outer layer; and an inner layer made of cast iron or steel, which is formed inside the intermediate layer.

The second centrifugally cast composite roll of the present invention comprises an outer layer having a structure in which 20-60% by area of MC carbide particles are dispersed; an intermediate layer made of a high-speed steel alloy, which is formed inside the outer layer; and an inner layer made of cast iron or steel.

In the centrifugally cast composite roll of the present invention, tensile strength between the outer layer and the intermediate layer is preferably 400 MPa or more, and when a test piece including a boundary between the outer layer and the intermediate layer is subjected to a tensile test, tensile fracture occurs preferably in the outer or intermediate layer excluding the boundary.

The intermediate layer preferably has a composition comprising by mass 0.5-3% of C, 0.1-3% of Si, 0.1-3% of Mn, 1-10% of V, and Mo and W satisfying the following formula (1):

$$1\% \leq Mo\% + (W\%/2) \leq 6\% \text{ (by mass)} \quad (1),$$

the balance being Fe and inevitable impurities.

At least part of V in the intermediate layer is preferably substituted by Nb in an amount satisfying the following formulae (2) and (3):

$$1\% \leq V\% + 0.55 \times Nb\% \leq 10\% \text{ (by mass)} \quad (2), \text{ and}$$

$$Nb \leq 6\% \text{ (by mass)} \quad (3).$$

The intermediate layer preferably further meets the following formula (4):

$$0.3\% \leq C\% - 0.2 \times (V\% + 0.55 \times Nb\%) \leq 2\% \text{ (by mass)} \quad (4).$$

The intermediate layer preferably further comprises 0.5-10% by mass of Cr. The intermediate layer preferably further comprises 2% or less by mass of Ni. The intermediate layer preferably further comprises 10% or less by mass of Co. The intermediate layer preferably further comprises 0.5% or less by mass of Ti and/or 0.5% or less by mass of Al.

The intermediate layer preferably has a matrix structure based on martensite and/or bainite.

The intermediate layer is preferably as thick as 5 mm or more.

The outer layer preferably further comprises at least one selected from the group consisting of 1-15% of Cr, 0.5-20% of Mo and 1-40% of W by mass.

At least part of V in the outer layer is preferably substituted by Nb in an amount satisfying the following formula (5):

$$11\% \leq V\% + 0.55 \times Nb\% \leq 40\% \text{ (by mass)} \quad (5).$$

The outer layer preferably further meets the following formula (6):

$$0 \leq C\% - 0.2 \times (V\% + 0.55 \times Nb\%) \leq 2\% \text{ (by mass)} \quad (6).$$

The outer layer preferably further meets the following formula (7):

0.2>Nb %/V % (by mass)  (7).

The outer layer preferably further comprises 2% or less by mass of Ni and/or 10% or less by mass of Co. The outer layer preferably further comprises 0.5% or less by mass of Ti and/or 0.5% or less by mass of Al. The V content in the MC carbide in the outer layer is preferably 30% or more by mass.

The outer layer preferably has a structure, in which the diameter of the maximum circle inscribed in a region containing no MC carbide particles having equivalent-circle diameters of 15 μm or more is not more than 150 μm. An average distance (B) between MC carbide particles having equivalent-circle diameters of 15 μm or more is preferably 10-40 μm, and an average equivalent-circle diameter (A) of the MC carbide particles is preferably 10-50 μm. The ratio (B/A) of the average distance (B) to the average equivalent-circle diameter (A) is preferably 2 or less.

The carbides of $M_2C$, $M_6C$ and $M_7C_3$ having equivalent-circle diameters of 1 μm or more may be dispersed in a total amount of 0-5% by area in the outer layer.

DESCRIPTION OF THE PREFERRED EMBODIMENTS

Figure 1:
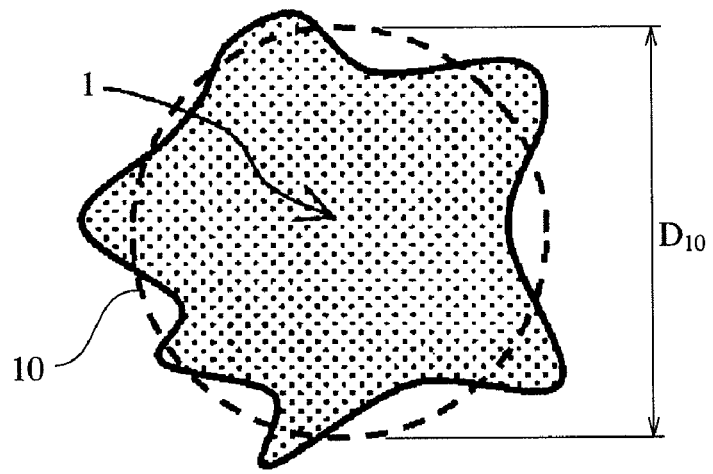
FIG. 1 is a schematic view showing a method for determining an equivalent-circle diameter of an MC particle.

The centrifugally cast composite roll of the present invention comprises an outer layer in which MC carbide is crystallized in a large amount, an intermediate layer made of a high-speed steel alloy, which is formed inside the outer layer, and an inner layer made of cast iron or steel, which is formed inside the intermediate layer. The centrifugally cast composite roll of the present invention may be either solid or hollow, as long as it has an outer layer, an intermediate layer and an inner layer.

[1] Outer Layer (A) Composition (% by Mass)

(1) Indispensable Components (a) C: 2.5-9%

C is an indispensable element mainly combined with alloying elements such as V, Nb, etc. to form MC carbides, thereby improving wear resistance. C not combined with the alloying elements is dissolved or extremely finely precipitated mainly in a matrix, thereby strengthening the matrix. When C is less than 2.5%, insufficient MC carbide is formed, failing to achieve sufficient wear resistance. When C exceeds 9%, too much carbides are formed, providing the outer layer for a roll with deteriorated heat cracking resistance. The C content is preferably 3.5-9%, more preferably 4.5-9%.

(b) Si: 0.1-3.5%

Si functions as a deoxidizer in a melt. When Si is less than 0.1%, insufficient deoxidizing effect is obtained, making it likely that the outer layer has casting defects. When Si exceeds 3.5%, the outer layer for a roll becomes brittle. The Si content is preferably 0.2-2.5%, more preferably 0.2-1.5%.

(c) Mn: 0.1-3.5%

Mn functions to deoxidize the melt and fix S, an impurity, as MnS. When Mn is less than 0.1%, these effects are insufficient. When Mn exceeds 3.5%, the outer layer tends to have residual austenite, failing to stably maintain hardness and thus being likely to have deteriorated wear resistance. The Mn content is preferably 0.2-2.5%, more preferably 0.2-1.5%.

(d) V: 11-40%

V is an element mainly combined with C to form MC carbide. In order that the outer layer for a roll contains a large amount of MC carbide, 11-40% of V is needed. When V is less than 11%, sufficient MC carbide is not formed, failing to obtain sufficient wear resistance. When V is more than 40%, excess MC carbide is formed, providing the outer layer for a roll with deteriorated toughness. The V content is preferably 15-40%, more preferably 18-40%.

(e) Nb

Nb has the same function as that of V in forming MC carbide. Their atomic weight ratio makes 0.55×Nb % equivalent to V % by mass. Accordingly, part or all of V may be substituted by Nb in an amount satisfying the following formula (5):

$$11\% \leq V\% + 0.55 \times Nb\% \leq 40\% \text{ (by mass)} \quad (5).$$

The range of (V %+0.55×Nb %) is more preferably 15-40% by mass, most preferably 18-40% by mass.

Nb preferably satisfies with C and V the following formula (6):

$$0 \leq C\% - 0.2 \times (V\% + 0.55 \times Nb\%) \leq 2\% \text{ (by mass)} \quad (6).$$

When the value of [C %−0.2×(V %+0.55×Nb %)] is less than 0, sufficient MC carbide is not formed, resulting in excess V and Nb in the matrix and thus failing to achieve sufficient hardness and wear resistance. When the value of [C %−0.2×(V %+0.55×Nb %)] exceeds 2%, non-MC carbides such as $M_2C$, $M_6C$, $M_7C_3$, etc. are crystallized in a network manner, providing the outer layer for a roll with deteriorated heat cracking resistance.

The outer layer preferably further satisfies the following formula (7):

$$0.2 > Nb\%/V\% \text{ (by mass)} \quad (7).$$

When the value of (Nb %/V %) is 0.2 or more, it is difficult to uniformly disperse MC carbide particles. When distances between MC carbide particles are uneven due to their aggregation, cracking tends to propagate predominantly in portions with narrow distances, resulting in deteriorated heat cracking resistance.

(2) Optional Components

Depending on the application and usage of a centrifugally cast composite roll, the outer layer may optionally contain elements described below.

(a) Cr: 1-15%

Cr is dissolved in the matrix to increase hardenability, and part of Cr is combined with C to precipitate extremely fine carbide, thereby strengthening the matrix. When Cr is less than 1%, a sufficient matrix-strengthening effect is not obtained. When Cr exceeds 15%, other carbides than the MC carbide, such as $M_7C_3$ carbide, etc., are crystallized in a network manner, providing the outer layer for a roll with deteriorated heat cracking resistance. The more preferred Cr content is 3-9%.

(b) Mo: 0.5-20%

Mo is dissolved in the matrix to increase hardenability, and part of Mo is combined with C to precipitate extremely fine carbide, thereby strengthening the matrix. Also, part of Mo forms MC carbide. When Mo is less than 0.5%, a sufficient matrix-strengthening effect is not obtained. When Mo exceeds 20%, non-MC carbides such as $M_2C$, $M_6C$, etc. are crystallized in a network manner, providing the outer layer for a roll with deteriorated heat cracking resistance. The Mo content is more preferably 2.5-20%, particularly 2.5-10%.

(c) W: 1-40%

W is dissolved in the matrix to increase hardenability, and part of W is combined with C to precipitate extremely fine carbide, thereby strengthening the matrix. Also, part of W forms MC carbide. When W is less than 1%, a sufficient matrix-strengthening effect is not obtained. When W exceeds 40%, non-MC carbides such as $M_6C$, $M_2C$, etc. are crystallized in a network manner, providing the outer layer for a roll with deteriorated heat cracking resistance. The W content is more preferably 5-40%, particularly 5-20%.

To provide the outer layer of the roll of the present invention with sufficient wear resistance, it is preferable to add at least one of Cr, Mo and W as a matrix-strengthening element.

(d) Ni: 2% or Less

Ni is dissolved in the matrix to effectively improve the hardenability of the matrix. When Ni exceeds 2%, austenite is stabilized in the matrix, resulting in an insufficient matrix-hardening effect.

(e) Co: 10% or Less

Co is dissolved in the matrix to strengthen it. The inclusion of Co makes it possible to keep the hardness of the matrix even at high temperatures. When Co exceeds 10%, the outer layer for a roll has reduced toughness. Because Co is expensive, its amount is desirably determined with cost and use conditions taken into consideration.

(f) Ti: 0.5% or Less

Ti functions as a deoxidizer in the melt, and is combined with N to form a nitride as a nucleus for MC carbide, thereby making the MC carbide finer. Also, part of Ti is combined with C to form MC carbide. The addition of 0.5% or less of Ti would provide sufficient effects.

(g) Al: 0.5% or Less

Al functions as a deoxidizer in the melt and makes MC carbide finer. When Al exceeds 0.5%, the hardenability of the outer layer is deteriorated, failing to provide the matrix with sufficient hardness.

(B) Structure and Properties (1) MC Carbide

Because the MC carbide is higher in hardness than the other carbides such as $M_2C$, $M_6C$, $M_7C_3$, etc., it contributes to improvement of wear resistance. Also, because the MC carbide is so stable at high temperatures that it is unlikely to have metal bonding with a work, it has excellent effect on improving seizure resistance. When the MC carbide is less than 20% by area, sufficient wear resistance, seizure resistance and heat cracking resistance are not obtained. When the MC carbide exceeds 60% by area, a seizure-resistance-improving effect is saturated, and the toughness of the roll outer layer is remarkably reduced. In addition, it makes adjacent MC carbide particles closer, making the propagation of cracking easier and thus deteriorating the heat cracking resistance. Accordingly, the MC carbide is 20-60% by area, preferably 30-50% by area. 30% or more by mass of V is preferable in the MC carbide in the outer layer, because it remarkably improves the wear resistance.

(2) Size of MC Carbide Particles

The average diameter of circles equivalent to MC carbide particles (granular carbide particles) is preferably 10-50 μm. Because the roll is in contact with a high-temperature steel sheet being hot-rolled, its matrix is softened to a depth of about 10 μm from the surface. Accordingly, when an average diameter of circles equivalent to the MC carbide particles (average equivalent-circle diameter of the MC carbide particles) is less than 10 μm, the matrix cannot sufficiently retain the MC carbide particles, resulting in the roll with low wear resistance and surface roughening resistance. When the average equivalent-circle diameter exceeds 50 μm, the effect of improving surface roughening resistance is saturated, and the toughness is reduced. The average equivalent-circle diameter of the MC carbide particles is more preferably 10-40 μm, most preferably 15-30 μm.

As shown in FIG. 1, the equivalent-circle diameter of an MC carbide particle 1 is defined as a diameter $D_{10}$ of a circle 10 having the same area as that of the MC carbide particle 1. Assuming that the MC carbide particle 1 has an area S, $D_{10}=2\times(S/\pi)^{1/2}$. The average equivalent-circle diameter of the MC carbide particles is an average of $D_{10}$.

(3) Average Distance Between MC Carbide Particles

In the structure of the outer layer of the roll of the present invention, an average distance between MC carbide particles having equivalent-circle diameters of 15 μm or more is preferably 10-40 μm. When the average distance between MC carbide particles is less than 10 μm, too much segregation of the MC carbide occurs, resulting in MC carbide-rich portions and MC carbide-poor portions. Their wear difference generates microscopic roughness, resulting in low surface roughening resistance. When the average distance between MC carbide particles is more than 40 μm, there is non-negligible unevenness in the distribution of MC carbide particles, failing to achieve the improvement of seizure resistance. The average distance between MC carbide particles having equivalent-circle diameters of 15 μm or more is more preferably 20-30 μm.

Figure 2:
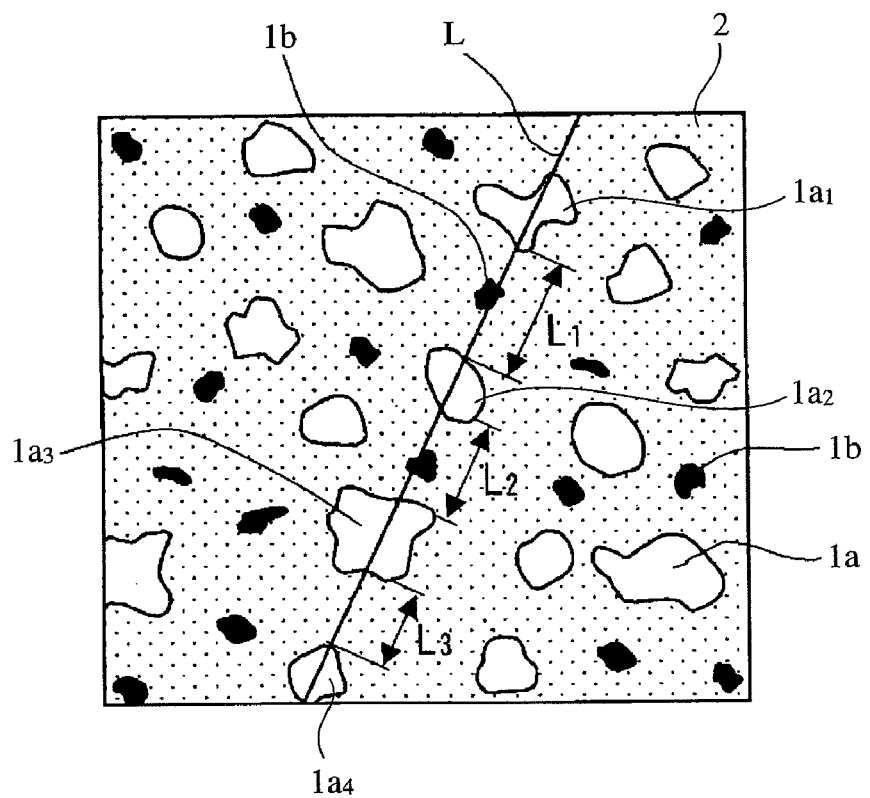
FIG. 2 is a schematic view showing a method for determining an average distance between MC carbide particles.

The determination of the average distance between MC carbide particles will be explained, referring to FIG. 2 schematically indicating the structure of the outer layer for a roll. This structure contains MC carbide particles (white) $1a$ having equivalent-circle diameters of 15 μm or more, and MC carbide particles (black) $1b$ having equivalent-circle diameters of less than 15 μm. The numerical reference "2" denotes a matrix containing carbides of $M_2C$, $M_6C$ and $M_7C_3$. A straight line L arbitrarily drawn on this structure intersects MC carbide particles $1a_1$, $1a_2$, $1a_3$ . . . $1a_n$, so that the distances $L_1$, $L_2$, $L_3$ . . . $L_n$ of these MC carbide particles are calculated. Accordingly, an average distance between MC carbide particles having equivalent-circle diameters of 15 μm or more is determined by $(L_1+L_2+\ldots+L_n)/n$.

(4) Average Distance Between MC Carbide Particles/average Equivalent-circle Diameter In the structure of the outer layer of the roll of the present invention, the ratio (B/A) of the average distance B between MC carbide particles having equivalent-circle diameters of 15 μm or more to the average equivalent-circle diameter A of the MC carbide particles is preferably 2 or less. MC carbide particles are easily aggregated in the outer layer of the roll of the present invention containing large amounts of MC carbide particles. The aggregation of MC carbide particles generates MC carbide-rich portions and MC carbide-poor portions, and their wear difference provides microscopic roughness, resulting in poor surface roughening resistance. The B/A ratio is a measure of how much MC carbide particles are aggregated. When the B/A ratio exceeds 2, the MC carbide particles are too much aggregated. The more preferred B/A ratio is 1.5 or less.

(5) Diameter of Maximum Circle Inscribed in Region Containing No MC Carbide Particles In the structure of the outer layer of the roll of the present invention, the diameter of the maximum circle inscribed in a region containing no MC carbide particles having equivalent-circle diameters of 15 μm or more is preferably not more than 150 μm. When the diameter of the maximum inscribed circle is more than 150 μm, there is non-negligibly large unevenness in the distribution of MC carbide. The diameter of the maximum inscribed circle is preferably 120 μm or less, more preferably 80 μm or less.

Figure 3:
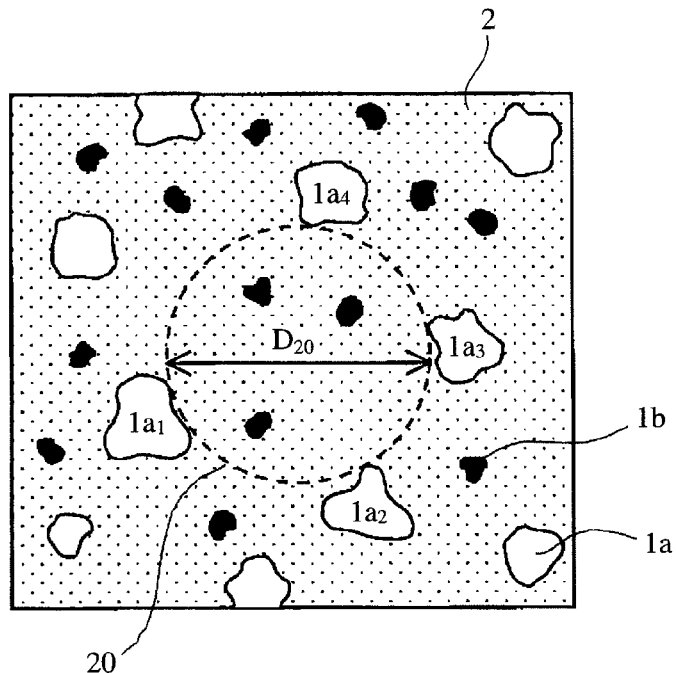
FIG. 3 is a schematic view showing a method for determining the diameter of the maximum circle inscribed in a region containing no MC carbide particles.

The diameter of the maximum circle inscribed in a region containing no MC carbide particles having equivalent-circle diameters of 15 μm or more is determined as shown in FIG. 3. In the depicted field, a circle 20 inscribed in MC carbide particles $1a_1$, $1a_2$, $1a_3$, $1a_4$ having equivalent-circle diameters of 15 μm or more has a diameter $D_{20}$. In the same manner, the diameters of circles inscribed in the other MC carbide particles are determined. This operation is conducted in pluralities of arbitrary fields to determine the diameter $D_{20max}$ of the maximum inscribed circle. P (6) Hardness of Matrix The matrix is mainly composed of Fe and alloying elements, and its hardness changes depending on transformation and the precipitation of extremely fine carbides by heat treatment. When the matrix hardness is less than 550 in Vickers hardness Hv, the outer layer for a roll has insufficient wear resistance. To improve wear resistance, a harder matrix is more preferable, but when it is harder than Hv 900, the matrix has reduced toughness. The hardness of the matrix is more preferably Hv 650-850, further preferably Hv 650-750.

(7) Non-MC Carbides

In the outer layer of the roll of the present invention, non-MC carbides such as $M_2C$, $M_6C$ and $M_7C_3$, whose equivalent circles have diameters of 1 μm or more, may be dispersed in a total amount of 0-5% by area. When the non-MC carbide exceeds 5% by area in total, coarse non-MC carbide particles deteriorate the surface roughening resistance and toughness of the roll, and cracks propagate along non-MC carbides crystallized in a network manner, resulting in reduced heat cracking resistance. A smaller total area ratio of non-MC carbides provides better results. The total area ratio of $M_2C$, $M_6C$ and $M_7C_3$ carbides, whose equivalent circles have diameters of 1 μm or more, is more preferably 0-3%, further preferably 0-1%. Incidentally, other carbides than MC, $M_2C$, $M_6C$ and $M_7C_3$ may be contained in trace amounts.

[2] Inner Layer

Because the inner layer (shaft) of the composite roll is subjected to a large load, it is preferably formed by high-toughness cast iron or steel. Specifically, the inner layer alloy is preferably cast iron such as spheroidal graphite cast iron, flake graphite cast iron, etc., or cast steel such as graphite steel, Adamite, etc. Because these cast iron and steel are well known, the explanation of their compositions will be omitted. Materials for the inner layer may be properly selected depending on applications and objects.

[3] Intermediate Layer

The outer layer in which a large amount of granular MC carbide is crystallized has a small thermal expansion coefficient, and its matrix structure expands due to transformation to martensite and/or bainite by a hardening heat treatment. Accordingly, there is large thermal expansion difference between the outer layer and the inner layer. Therefore, a large tensile stress in the radial direction of the roll is generated in the bonding boundary, so that the spalling of the outer layer easily occurs during cooling after casting and during rolling. As a result of intense research to solve this problem, it has been found that the formation of the intermediate layer made of a high-speed steel alloy between the outer layer and the inner layer alleviates expansion difference between the outer layer and the inner layer, with reduced residual tensile stress in a boundary with the outer layer.

(A) Composition (% by Mass)
(1) Indispensable Components
(a) C: 0.5-3%

The C content is controlled such that the intermediate layer is provided with improved bonding strength to the outer layer having a structure in which a large amount of granular MC carbide is dispersed. When C is less than 0.5%, sufficient melt-bonding to the outer layer is unlikely obtained, causing casting defects such as voids, etc. in a bonding boundary with the outer layer. When C exceeds 3%, a low-toughness carbide layer is generated in the bonding boundary with the outer layer, resulting in reduced tensile strength. The more preferred C content is 0.8-2.4%.

(b) Si: 0.1-3%

Si functions as a deoxidizer in the melt. When Si is less than 0.1%, a sufficient deoxidizing effect cannot be obtained, making it likely to generate casting defects. When Si exceeds 3%, the intermediate layer improperly becomes brittle due to decrease in hardenability. The Si content is more preferably 0.2-1.5%, further preferably 0.2-1%.

(c) Mn: 0.1-3%

Mn functions to deoxidize the melt and fix S, an impurity, as MnS. This function is effectively exhibited when Mn is 0.1% or more. However, when Mn exceeds 3%, the intermediate layer improperly becomes brittle. The Mn content is more preferably 0.2-1.5%, further preferably 0.2-1%.

(d) Mo: 1-6%

Mo contributes to improving the strength (particularly hot strength) of the intermediate layer. Further, Mo is so effective for improving hardenability that the structure of martensite or bainite can be easily obtained. When Mo is 1% or more, these effects are remarkable. Even if Mo exceeds 6%, a further improvement of the effect cannot be obtained, and the toughness of the intermediate layer rather decreases because of excess generation of carbides. In addition, because Mo is an expensive alloying element, its excess addition is economically disadvantageous. The Mo content is more preferably 2-4%.

(e) W: 0-12%

Like Mo, W not only contributes to improving the strength (particularly hot strength) of the intermediate layer, but also is so effective for improving the hardenability that the structure of martensite or bainite can be obtained easily. However, even if W exceeds 12%, a further improvement of the effect cannot be obtained, but carbides are excessively generated, resulting in decrease in toughness. In addition, because W is an expensive alloying element, its excess addition is economically disadvantageous. Accordingly, the W content is preferably 0-12%, more preferably 0-8%.

(f) $1\% \leq Mo\% + (W\%/2) \leq 6\%$

Although W has a similar function to that of Mo, its effect is ½ (by mass) of Mo. When Mo is added together with W, their total amount represented by [Mo %+(W %/2)] according to their effects can be controlled to provide the intermediate layer with more preferred properties. When [Mo %+(W %/2)] is less than 1%, the strength and hardenability of the intermediate layer cannot be sufficiently improved. When [Mo %+(W %/2)] exceeds 6%, the above effects are saturated, and the toughness decreases by excessively generated carbides. The more preferred range of [Mo %+(W %/2)] is 2-4%.

(g) V: 1-10%

V is mainly combined with C to form MC carbide. V mainly contributes to the improvement of hardenability and the improvement of strength and toughness by forming a microstructure. However, when V is less than 1%, these effects are not remarkable. When V exceeds 10%, the excessively generated MC carbide is segregated, resulting in decrease in strength and toughness. The V content is more preferably 1-6%.

(2) Optional Components

The outer layer surface is melted during centrifugal casting, so that components in the outer layer partially enter the intermediate layer. The migration of the following components would not cause any problems as long as they are within the predetermined ranges. Also, to adjust the hardenability, etc. of the intermediate layer, the following components may be added intentionally.

(a) Nb

Like V, Nb is effective to improve hardenability and strength. Because their atomic weight ratio makes 1% of V equivalent to 0.55% of Nb by mass, part or all of V may be substituted by Nb in a range satisfying the following conditions;

$$1\% \leq V\% + 0.55 \times Nb\% \leq 10\%, \text{ and}$$

$$Nb \leq 6\%.$$

When Nb exceeds 6%, a large amount of MC carbide is crystallized, resulting in undesirable decrease in strength and toughness.

(b) $0.3\% \leq C\% - 0.2 \times (V\% + 0.55 \times Nb\%) \leq 2\%$

When [C %−0.2×(V %+0.55Nb %)] is less than 0.3%, a sufficient amount of C is not dissolved in austenite in the matrix by a hardening heat treatment, resulting in reduced hardenability. When [C %−0.2×(V %+0.55Nb %)] exceeds 2%, an increased amount of carbide is contained not only in a bonding boundary between the outer layer and the intermediate layer but also in the intermediate layer, resulting in remarkably reduced strength and toughness. Also, a fine pearlite phase called troostite is undesirably formed in the matrix, so that the outer layer has low spalling resistance. The preferred range of [C %−0.2×(V %+0.55Nb %)] is 0.6-1.5%.

(c) Cr: 0.5-10%

Cr is dissolved in the matrix to increase hardenability, and part of Cr is combined with C in the matrix to precipitate extremely fine carbide, thereby strengthening the matrix. When Cr is less than 0.5%, a sufficient matrix-strengthening effect cannot be obtained. When Cr exceeds 10%, carbides such as $M_7C_3$ increase, resulting in reduced toughness. The more preferred Cr content is 2-8%.

(d) Ni: 2% or Less

Ni is effectively dissolved in the to improve the hardenability of the intermediate layer. Because the hardenability of the intermediate layer has already been increased by alloying elements such as Mo, etc., Ni is optionally added. However, because Ni does not form carbide, its addition to a large-diameter roll, etc., which cannot be hardened speedily, easily provides the intermediate layer with a bainite or martensite structure. Although 0.2% or more of Ni remarkably provides such effect, the addition of more than 2% of Ni makes a large amount of austenite remain after the hardening heat treatment, resulting in deteriorated toughness. The more preferred Ni content is 0.2-1.5%.

(e) Co: 10% or Less

Co is dissolved in the matrix to improve high-temperature strength. However, more than 10% of Co undesirably reduces the toughness.

(f) Ti: 0.5% or Less

Ti functions as a deoxidizer in the melt. Ti is also effective to make the structure finer, contributing to improving the strength and toughness. Such effect can be obtained by up to 0.5% of Ti, and more than 0.5% of Ti undesirably increases the viscosity of the melt.

(g) Al: 0.5% or Less

Al functions as a deoxidizer in the melt. Such effect can be obtained by up to 0.5% of Al, and more than 0.5% of Al undesirably deteriorates the hardenability.

(B) Structure and Properties

The matrix structure of the intermediate layer is preferably based on martensite, bainite or a mixture thereof (50% or more by area). This structure, which is obtained by transformation by a hardening heat treatment, provides reduced expansion difference from the outer layer, thereby reducing a radial, residual tensile stress in the bonding boundary between the outer layer and the intermediate layer. This improves the spalling resistance of the outer layer.

In addition to martensite, bainite or a mixture thereof, the intermediate layer may have an inevitable structure such as residual austenite, or a pearlite structure such as troostite or a ferrite structure in a small amount. However, if the total amount of these structures is 50% or more by area, pearlitic transformation occurs by the hardening heat treatment, resulting in insufficient transformation expansion, thus failing to sufficiently exhibit the above residual-stress-reducing effect.

The outer layer and the intermediate layer having the above features have tensile strength of 400 MPa or more in their boundary. This prevents the outer layer from spalling due to the fatigue of the bonding boundary that is generated by stress applied during rolling. The boundary between the outer layer and the intermediate layer preferably has tensile strength of 500 MPa or more.

When a test piece including the bonding boundary between the outer layer and the intermediate layer is subjected to a tensile test, tensile fracture occurs preferably in a region other than the bonding boundary, namely in the outer or intermediate layer. Because there is not a tensile stress peak, from which fatigue failure occurs, in the bonding boundary, the roll can sufficiently withstand such high-load conditions as a work roll in a hot strip mill, without causing the spalling of the outer layer.

(C) Thickness

The intermediate layer as thick as 5 mm or more in a cross section perpendicular to the roll axis provides the outer layer with sufficient spalling resistance because of the above stress-reducing effect. When the thickness of the intermediate layer is less than 5 mm, a sufficient stress-reducing effect cannot be obtained, and alloying elements coming from the outer layer are not uniformly distributed in the intermediate layer, making it likely that problems such as the segregation of carbides occur. The thicker the intermediate layer is, the more reduced residual tensile stress the boundary has. However, if the intermediate layer is too thick, there is an increased axial, residual tensile stress in the center of the inner layer, resulting in reduced bending resistance. When the intermediate layer is thicker than 150 mm, the intermediate layer per se is likely to have defects, lowering the strength. The thickness of the intermediate layer may be properly selected, taking into consideration the shape, size, required properties, etc. of a centrifugally cast composite roll produced. The thickness of the intermediate layer is preferably 10-100 mm, particularly 20-50 mm for hot-rolling applications. Although the intermediate layer may be constituted by a single layer, it may have two or more layers with the total thickness of 5 mm or more, depending on applications and purposes.

[4] Centrifugal Casting Method

An outer layer melt having a chemical composition adjusted to primarily crystallize MC carbide is charged into a cylindrical mold, and centrifugally cast. The composition of the outer layer formed utilizing the centrifugal separation of MC carbides in centrifugal casting differs from the melt composition. To obtain the outer layer composition described in [1] (A), the melt composition comprises, by mass, 2.2-6.0% of C, 0.1-3.5% of Si, 0.1-3.5% of Mn, and 8-22% of V, the balance being Fe and inevitable impurity elements. Because Nb substituting for at least part of V is centrifugally separated as MC carbide in centrifugal casting, Nb may be added to the melt in an amount satisfying 8%≦V %+0.55×Nb %≦22% (by mass).

The preferred melt composition comprises, by mass, 2.5-6.0% of C, 0.2-1.5% of Si, 0.2-1.5% of Mn, 10-22% of V, and Nb in an amount satisfying 10%≦V %+0.55×Nb %≦22%.

Among the optional elements, Cr, Mo, Ni, Co and Al are not substantially centrifugally separated, their contents in the melt may be substantially the same as in the roll outer layer. Because part of W and Ti are dissolved in the primarily crystallized MC carbide, they are slightly centrifugally separated.

Figure 4A:
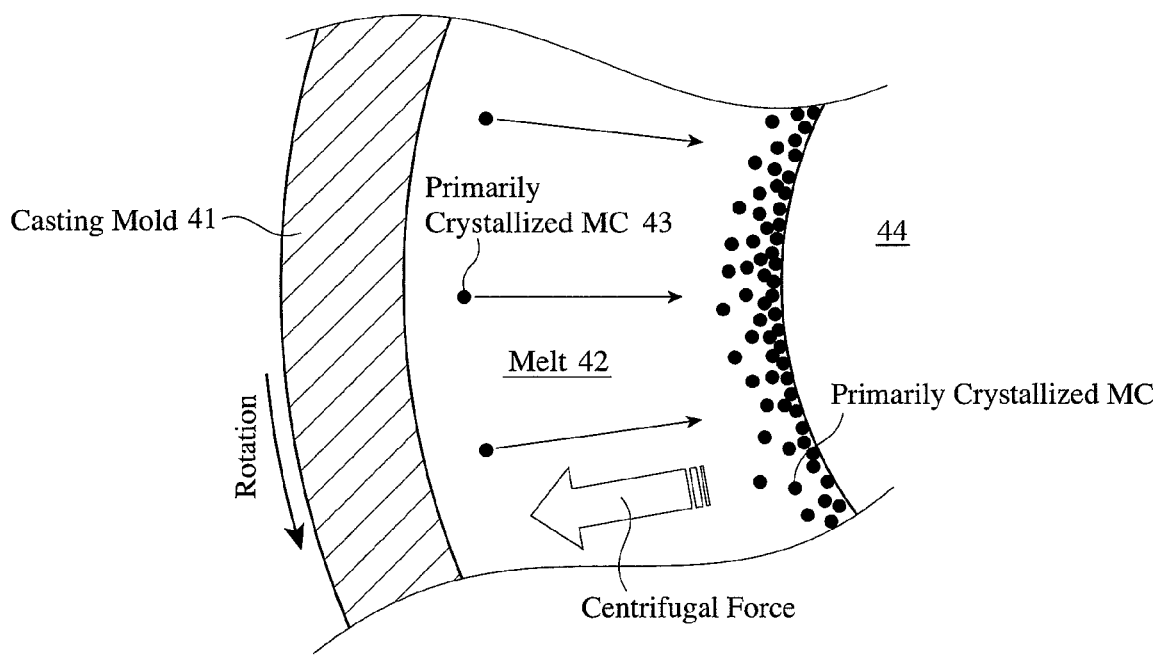
FIG. 4(a) is a schematic view showing the movement of MC carbide particles toward the inner surface side during centrifugal casting.
Figure 4B:
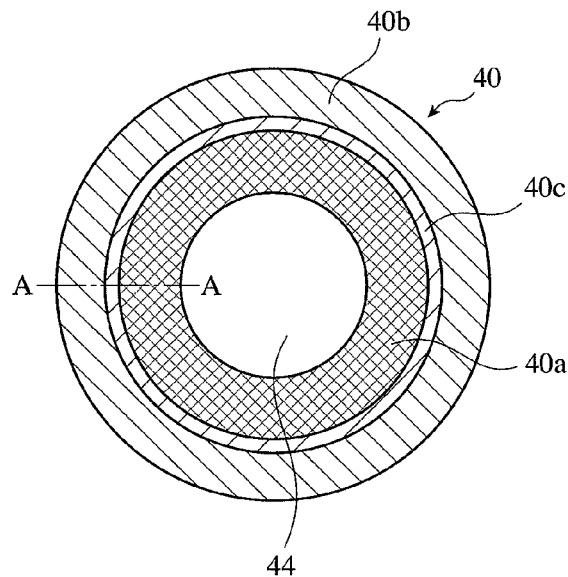
FIG. 4(b) is a radial-direction, cross-sectional view showing a centrifugally cast outer layer for the roll of the present invention.
Figure 4C:
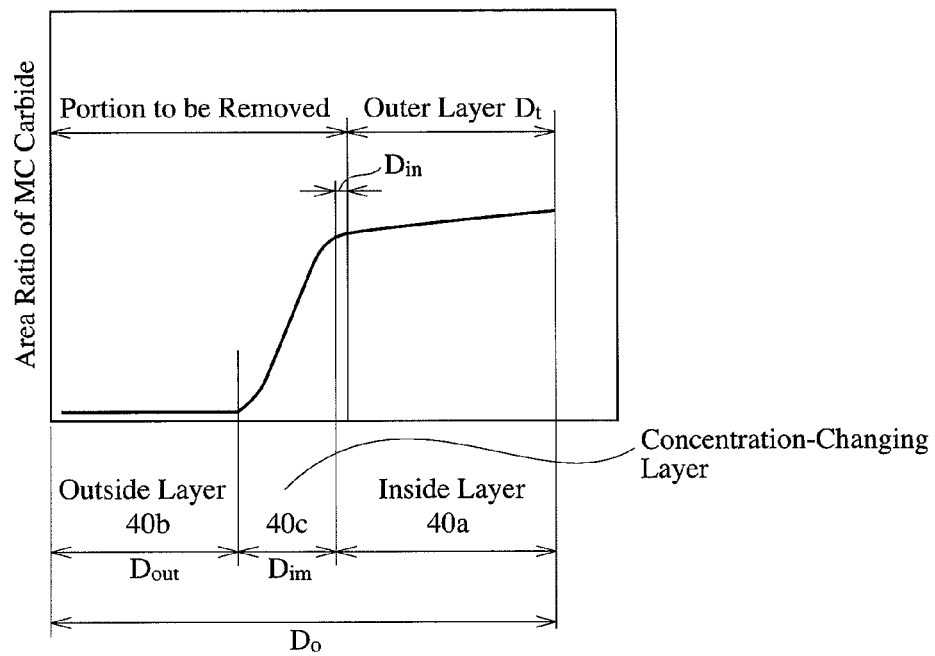
FIG. 4(c) is a graph showing the distribution of MC carbide in the A-A cross section of FIG. 4(b).

As shown in FIG. 4(a), primarily crystallized MC carbide 43 having a small specific gravity moves in the melt 42 toward an inner surface facing a hollow portion 44, during centrifugal casting in a mold 41. As shown in FIGS. 4(b) and 4(c), formed is a cylindrical body 40 comprising an inside layer 40a having concentrated MC carbide, an MC-carbide-poor outside layer 40b, and a concentration-changing layer 40c in which the area ratio of MC carbide gradually changes. All of the outside layer 40b and at least part of the concentration-changing layer 40c are then removed from the cylindrical body 40 by cutting, etc., to use a portion in which the MC carbide is concentrated (mainly inside layer 40a) as an outer layer for a centrifugally cast composite.

The thickness of the outside layer 40b and the concentration-changing layer 40c can be predicted, because it is determined by a melt composition and centrifugal casting conditions. Because all of the concentration-changing layer 40c need not be removed, it is determined in advance how deep the concentration-changing layer 40c is removed. To surely obtain high wear resistance, part of the inside layer 40a may of course be removed. As shown in FIG. 4(c), if experiment or simulation based on a melt composition and centrifugal casting conditions, for instance, determines the thickness Dout of an outside layer 40b to be completely removed, the depth Dim of the concentration-changing layer 40c to be at least partially removed, and the depth Din of a portion of the inside layer 40a to be removed if necessary, the thickness Do [=Dt+Dout+Dim (+Din)] of the cylindrical body 40 can be determined in advance, such that the inside layer 40a (or the inside layer 40a+part of the concentration-changing layer 40c) exposed by cutting the cylindrical body 40 to the depth of Dout+Dim (+Din) has a desired thickness (target thickness of the outer layer) Dt. Once the cylindrical body 40 having a larger thickness Do than the target thickness Dt of the outer layer is formed by a centrifugal casting method using an existing mold 41, a roll outer layer having a thickness Dt can be produced easily at a low cost by cutting the cylindrical body 40 to the depth of Dout+Dim (+Din).

In the present invention, it is preferable to predict a depth, at which the area ratio of MC carbide is 20% or more, from the distribution of the MC carbide expected by the melt composition and centrifugal casting conditions, thereby producing a cylindrical body having a larger outer diameter than the target outer diameter of the outer layer by the cutting depth.

An intermediate layer melt is charged into the outer layer formed in the centrifugal casting mold, and an inner layer melt is then charged into the intermediate layer. A composite roll thus formed is taken out of the mold, and properly subjected to a heat treatment such as hardening, etc. and machining.

The present invention will be explained in more detail referring to Examples below without intention of restricting the scope of the present invention.

REFERENCE EXAMPLES 1-5, COMPARATIVE EXAMPLES 1-3, AND CONVENTIONAL EXAMPLES 1 AND 2

Each outer layer melt having a chemical composition (% by mass) shown in Table 1 was centrifugally cast to produce a cylindrical body having an outer diameter of 450 mm, an inner diameter of 250 mm and a length of 800 mm. However, a stationarily casting method was used only in Comparative Example 1.

TABLE 1

| No. | Composition of Melt for Outer Layer (% by mass) | | | | | | | | | | | |
|---|---|---|---|---|---|---|---|---|---|---|---|---|
| | C | Si | Mn | V | Nb | Cr | Mo | W | Ni | Co | Ti | Al |
| Reference Example 1 | 4.4 | 0.9 | 0.7 | 17.3 | — | 4.6 | 5.3 | 19.3 | — | — | — | — |
| Reference Example 2 | 4.7 | 0.3 | 0.3 | 18.0 | — | 2.5 | 8.5 | — | — | 4.7 | 0.05 | — |
| Reference Example 3 | 2.8 | 0.2 | 0.9 | 7.7 | 1.7 | — | 2.3 | 3.2 | — | — | — | — |
| Reference Example 4 | 3.2 | 0.4 | 0.7 | — | 14.5 | 11.6 | 2.0 | 1.5 | — | — | — | — |
| Reference Example 5 | 2.6 | 0.7 | 0.5 | 11.6 | — | 8.8 | — | 12.0 | 1.5 | — | — | 0.11 |
| Comparative Example 1 | 4.3 | 1.0 | 0.5 | 19.3 | — | 4.1 | 0.3 | — | 0.6 | — | — | — |
| Comparative Example 2 | 2.0 | 1.5 | 0.2 | 21.7 | — | — | 2.4 | 6.8 | 2.3 | 8.3 | 0.11 | 0.23 |
| Comparative Example 3 | 5.1 | 0.4 | 0.6 | 9.4 | — | 15.9 | 2.4 | — | — | — | — | — |
| Conventional Example 1 | 3.0 | 2.0 | 0.5 | 5.0 | — | 2.0 | 1.0 | 1.0 | 4.0 | — | — | — |
| Conventional Example 2 | 2.0 | 0.8 | 0.4 | 5.3 | — | 6.7 | 2.7 | 2.4 | 0.6 | — | — | — |

A rod-shaped test piece was cut out of each cylindrical body of Reference Examples 1 and 3, and Conventional Example 2 in a radial direction, to measure the distributions of elements and MC carbide in the radial-direction cross section of the cylindrical body. The distributions of elements and MC carbide were determined by analyzing components and measuring the area ratio of MC carbide in each of plural samples cut out of the rod-shaped test piece at a 10-mm interval in a radial direction. The results are shown in FIGS. 5-10.

Figure 5:
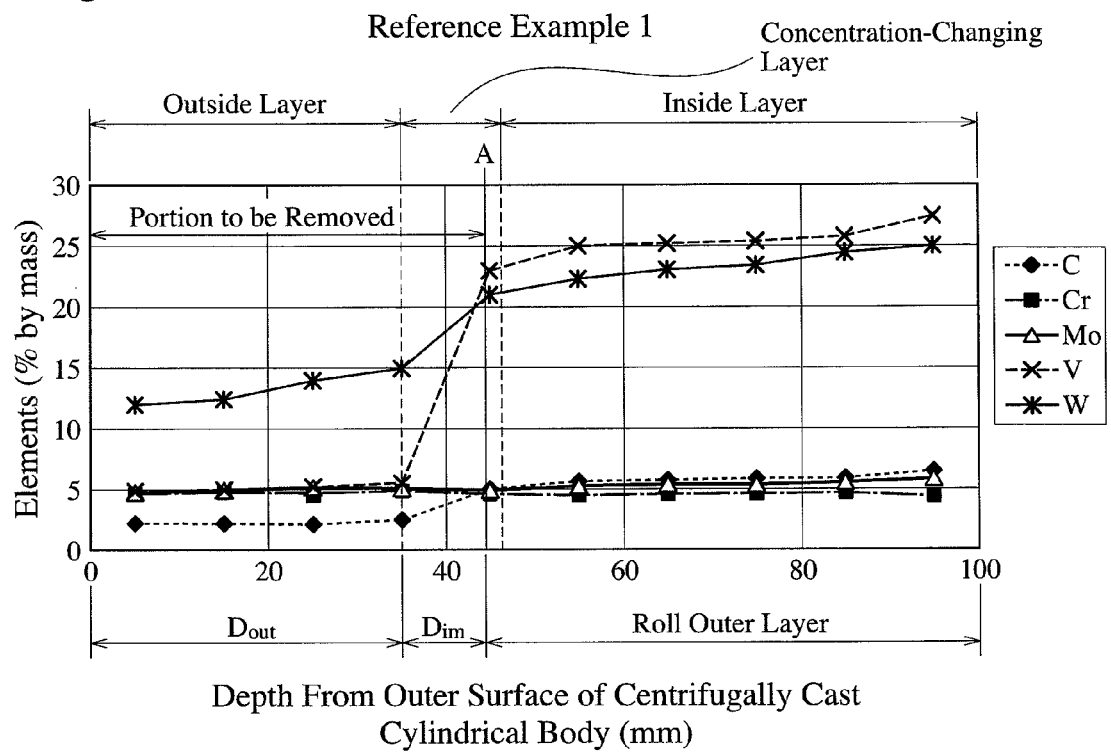
FIG. 5 is a graph showing the radial distribution of elements in the centrifugally cast cylindrical body of Reference Example 1.

As shown in FIG. 5, in the cylindrical body of Reference Example 1, the amount of V was as small as substantially 5% by mass in the outside layer but as much as 25% or more by mass in the inside layer, and the amount of W was as small as substantially 10-15% by mass in the outside layer but as much as 20-25% by mass in the inside layer. The amount of C was also as small as substantially 2.5% by mass in the outside layer but as much as 5% or more by mass in the inside layer. With respect to the other elements (Cr, Mo), there was substantially no concentration distribution from the outside layer to the inside layer.

Figure 6:
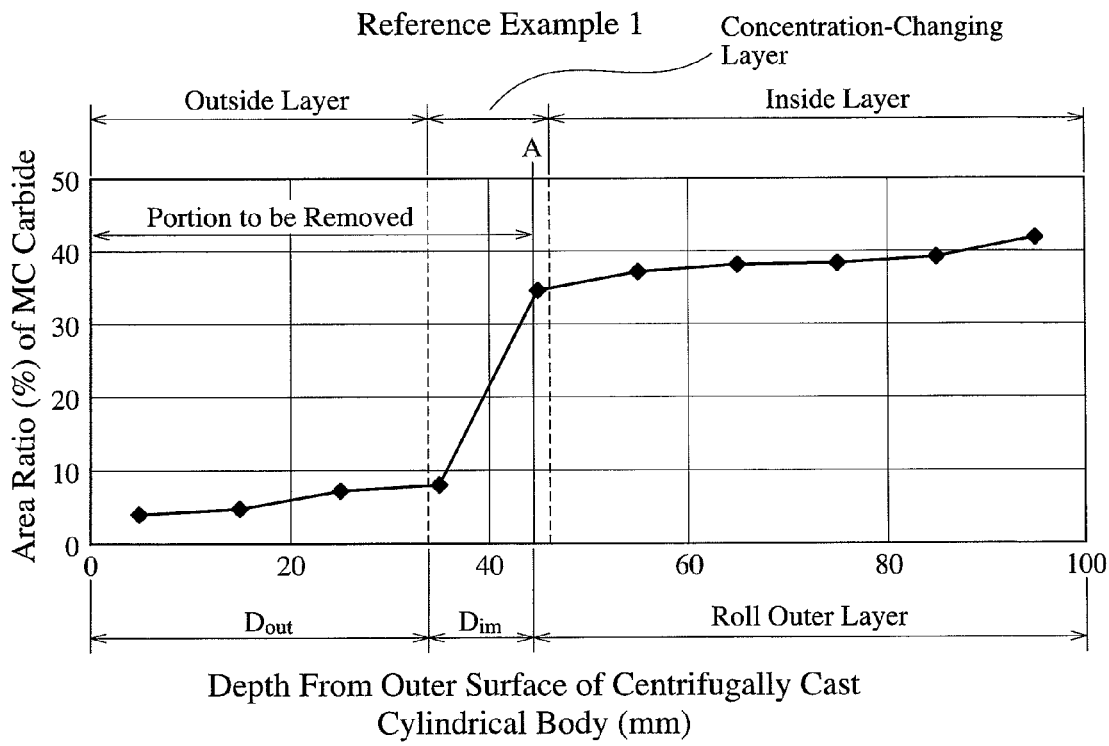
FIG. 6 is a graph showing the radial distribution of MC carbide particles in the centrifugally cast cylindrical body of Reference Example 1.

As shown in FIG. 6, the area ratio distribution of MC carbide had substantially the same tendency as that of the concentration distribution of V. That is, the area ratio of MC carbide was as small as substantially 4-8% in the outside layer, while it was as much as substantially 35% or more in the inside layer. Accordingly, the cylindrical body was cut to a depth including all of the outside layer and a most portion of the concentration-changing layer (shown by the line A in the figure), to use a portion containing 35% or more by area of MC carbide as an outer layer for a roll.

Figure 7:
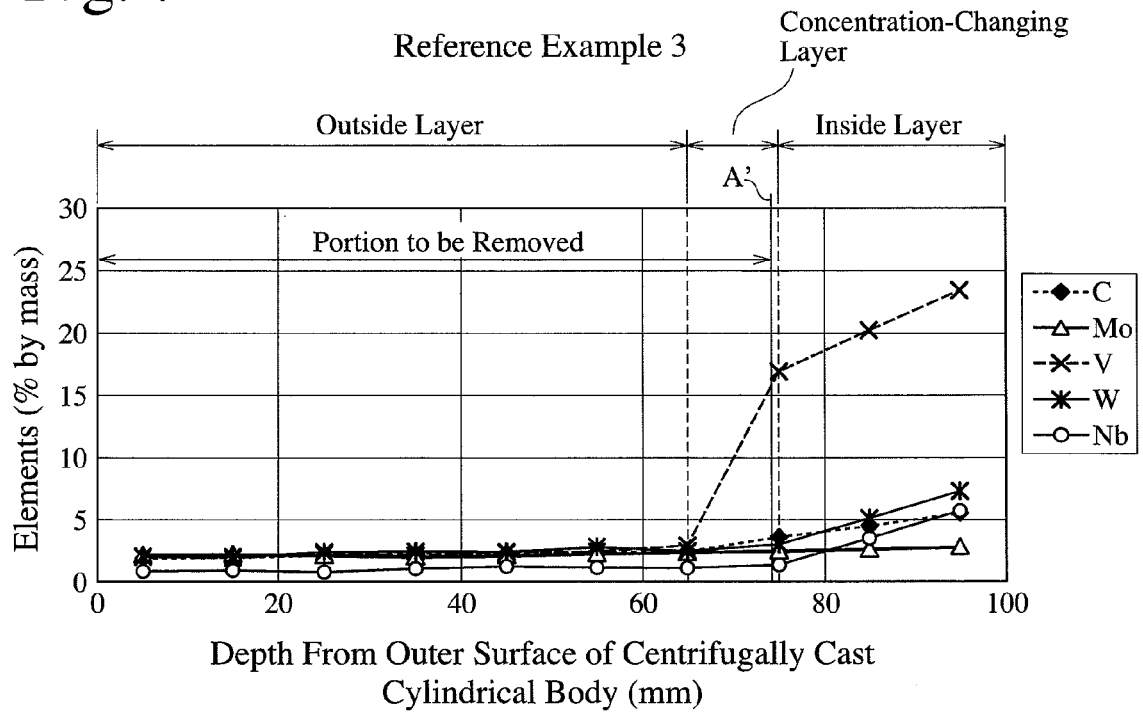
FIG. 7 is a graph showing the radial distribution of elements in the centrifugally cast cylindrical body of Reference Example 3.

As shown in FIG. 7, in the cylindrical body of Reference Example 3, the amount of V was as small as substantially 6% by mass or less in the outside layer but as much as 15% or more by mass in the inside layer, and the amounts of C, Nb and W were as small as substantially 5% by mass or less in the outside layer but slightly as much as 8% or more by mass in the inside layer. With respect to Mo, there was substantially no concentration distribution from the outside layer to the inside layer.

Figure 8:
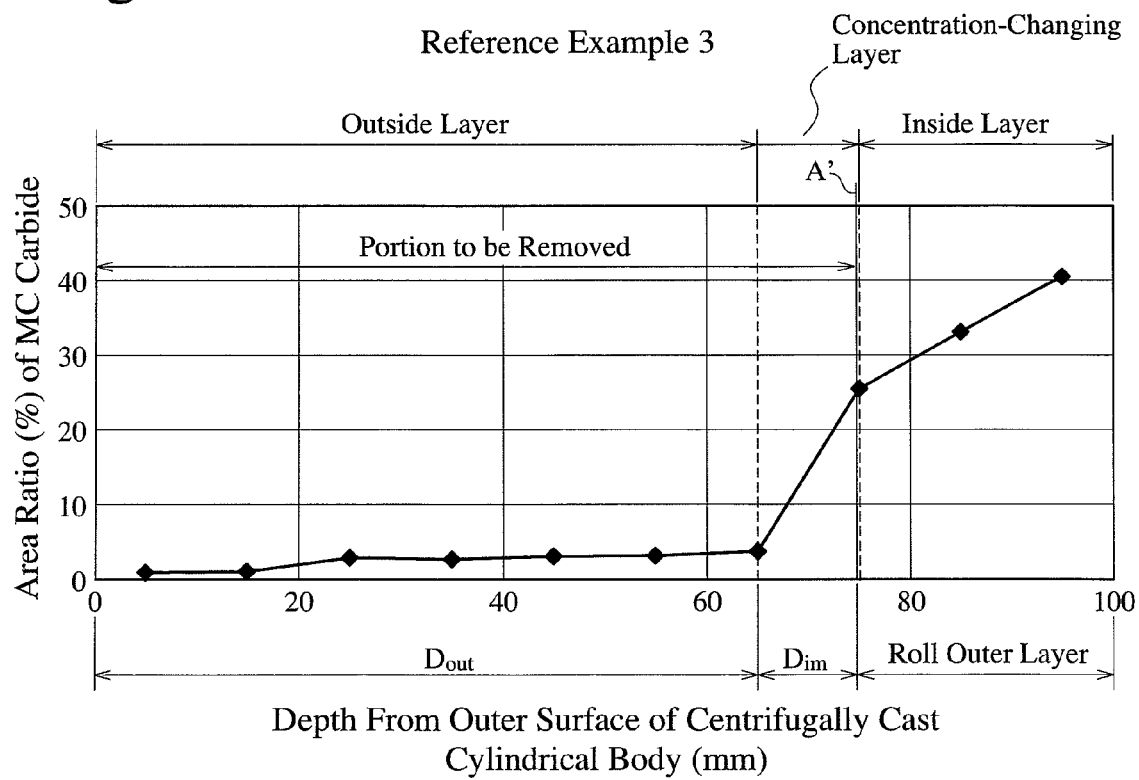
FIG. 8 is a graph showing the radial distribution of MC carbide in the centrifugally cast cylindrical body of Reference Example 3.

As shown in FIG. 8, the area ratio of MC carbide was as small as substantially 4% or less by area in the outside layer but as much as substantially 25% or more by area in the inside layer. Accordingly, the cylindrical body was cut to a depth including all of the outside layer and a most portion of the concentration-changing layer (shown by the line A' in the figure), to use a portion containing 25% or more by area of MC carbide as an outer layer for a roll.

Figure 9:
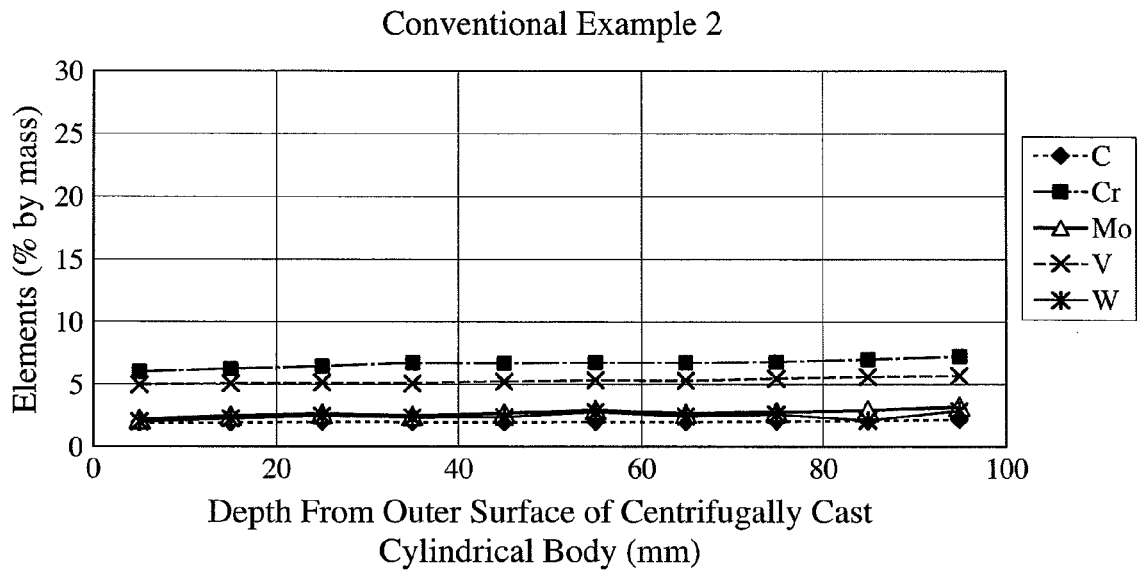
FIG. 9 is a graph showing the radial distribution of elements in the centrifugally cast cylindrical body of Conventional Example 2.
Figure 10:
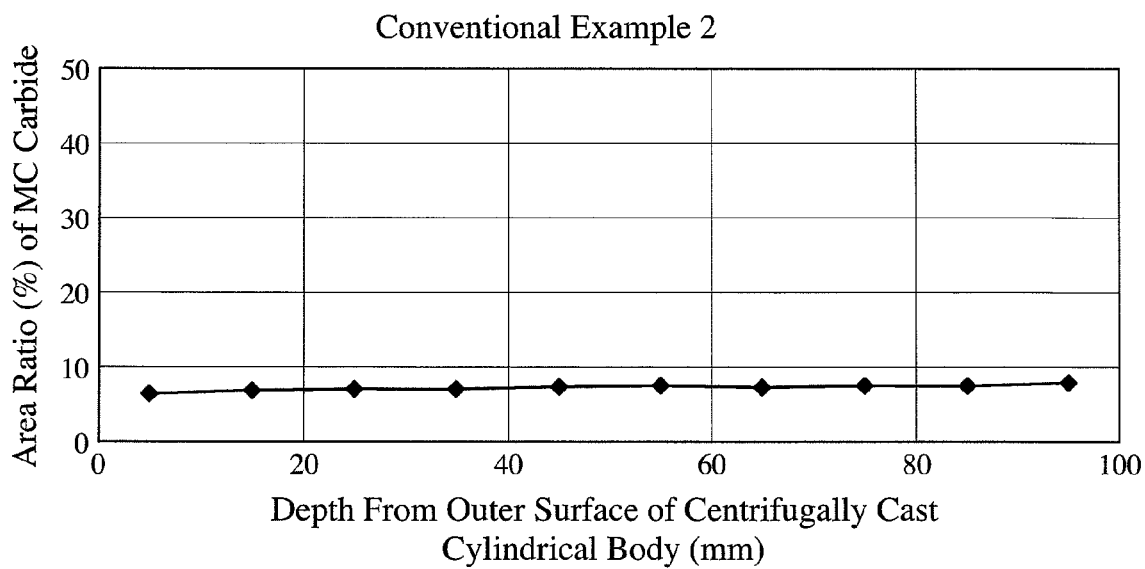
FIG. 10 is a graph showing the radial distribution of MC carbide in the centrifugally cast cylindrical body of Conventional Example 2.

In the cylindrical body of Conventional Example 2, as shown in FIGS. 9 and 10, there were substantially no concentration distributions of elements between the outside layer and the inside layer. The MC carbide was substantially 8% or less by area at any depth.

Like the cylindrical bodies of Reference Examples 1 and 3, outside layers were removed from the cylindrical bodies of other Reference Examples by cutting until portions containing concentrated MC carbide were exposed, to produce centrifugally cast roll outer layers. Each roll outer layer was subjected to a heat treatment comprising a hardening step at 1000-1200° C., and three annealing steps at 500-600° C. However, the roll outer layer of Conventional Example 1 was subjected to a heat treatment at 400-500° C. to decompose the residual austenite and to remove strain. The compositions of the roll outer layers thus obtained are shown in Table 2. In Table 2, X represents the value of the formula (a): [V %+0.55×Nb %], and Y represents the value of the formula (b): [C %−0.2×(V %+0.55×Nb %)].

TABLE 2

| No. | Composition of Outer Layer (% by mass) | | | | | | | |
|---|---|---|---|---|---|---|---|---|
| | C | Si | Mn | V | Nb | Cr | Mo | W |
| Reference Example 1 | 5.8 | 0.8 | 0.6 | 25.3 | — | 4.6 | 5.4 | 23.2 |
| Reference Example 2 | 8.1 | 0.3 | 0.3 | 34.8 | — | 2.5 | 8.7 | — |
| Reference Example 3 | 4.5 | 0.2 | 0.8 | 20.3 | 3.5 | — | 2.6 | 5.2 |
| Reference Example 4 | 4.9 | 0.4 | 0.6 | — | 27.4 | 12.9 | 2.2 | 1.9 |
| Reference Example 5 | 3.4 | 0.6 | 0.5 | 15.7 | — | 8.8 | — | 15.4 |
| Comparative Example 1 | 4.3 | 1.0 | 0.5 | 19.3 | — | 4.1 | 0.3 | — |
| Comparative Example 2 | 2.0 | 1.5 | 0.2 | 21.7 | — | — | 2.4 | 6.8 |
| Comparative Example 3 | 5.1 | 0.4 | 0.6 | 9.4 | — | 15.9 | 2.4 | — |
| Conventional Example 1 | 3.0 | 2.0 | 0.5 | 5.0 | — | 2.0 | 1.0 | 1.0 |
| Conventional Example 2 | 2.0 | 0.8 | 0.4 | 5.3 | — | 6.7 | 2.7 | 2.4 |

| No. | Composition of Outer Layer (% by mass) | | | | | |
|---|---|---|---|---|---|---|
| | Ni | Co | Ti | Al | X | Y |
| Reference Example 1 | — | — | — | — | 25.3 | 0.7 |
| Reference Example 2 | — | 4.7 | 0.15 | — | 34.8 | 1.1 |
| Reference Example 3 | — | — | — | — | 22.2 | 0.1 |
| Reference Example 4 | — | — | — | — | 15.1 | 1.9 |
| Reference Example 5 | 1.2 | — | — | 0.11 | 15.7 | 0.3 |
| Comparative Example 1 | 0.6 | — | — | — | 19.3 | 0.4 |
| Comparative Example 2 | 2.3 | 8.3 | 0.11 | 0.23 | 21.7 | -2.3 |
| Comparative Example 3 | — | — | — | — | 9.4 | 3.2 |
| Conventional Example 1 | 4.0 | — | — | — | 5.0 | 2.0 |
| Conventional Example 2 | 0.6 | — | — | — | 5.3 | 0.9 |

A test piece cut out of each roll outer layer was measured with respect to the V content (% by mass) in MC carbide, the area ratio $S_{MC}$ (%) of MC carbide, the area ratio $S_{MC10}$ (%) of MC carbide particles having equivalent-circle diameters of more than 10 μm, the total area ratio AA (%) of non-MC carbide particles ($M_2C$, $M_6C$ and $M_7C_3$) having equivalent-circle diameters of 1 μm or more, the average equivalent-circle diameter A (μm) of MC carbide particles, an average distance B (μm) between MC carbide particles having equivalent-circle diameters of 15 μm or more, a diameter BB (μm) of the maximum circle inscribed in a region containing no MC carbide particles having equivalent-circle diameters of 15 μm or more, the Vickers hardness (Hv) of the matrix at room temperature, wear depth (μm), surface roughness Rz (μm), fracture toughness KIC (kg/mm$^{3/2}$), and heat crack depth by the following methods. The measurement results are shown in Table 3.

(1) V Content in MC Carbide

Each test piece was mirror-finished, and its matrix was lightly etched with a picric ethanol solution. With respect to five MC carbide particles arbitrarily selected, elements having atomic weight over that of sodium were analyzed using an EDX analyzer (Delta III available from KEVEX), to determine the percentages by mass of V, which were averaged.

(2) Area Ratio of MC Carbide Particles ($S_{MC}$, $S_{MC10}$)

Each test piece was mirror-finished, and electrolytically etched with an aqueous solution of potassium dichromate to turn MC carbide black. Using an image analyzer (SPICCA-II available from Nippon Avionics Co., Ltd.), 20 arbitrary fields each corresponding to an area of 0.23 mm×0.25 mm in each test piece were observed to measure the area ratio $S_{MC}$ (%) of MC carbide particles, and the measured values were averaged. Further, only MC carbide particles having equivalent-circle diameters of more than 10 μm were measured to determine their area ratio $S_{MC10}$ (%).

(3) Total Area Ratio AA of Non-MC Carbides ($M_2C$, $M_6C$ and $M_7C_3$)

Each test piece was mirror-finished, and etched with Murakami's reagent to turn carbides of $M_2C$, $M_6C$ and $M_7C_3$ black or gray. Using the above image analyzer, 20 arbitrary fields each corresponding to an area of 0.23 mm×0.25 mm in each test piece were observed to measure the total area ratio (%) of carbides of $M_2C$, $M_6C$ and $M_7C_3$, and the measured values were averaged. It should be noted that measurement was conducted on easily discernible carbides of $M_2C$, $M_6C$ and $M_7C_3$, whose equivalent circles had diameters of 1 μm or more.

(4) Average Equivalent-circle Diameter a of MC Carbide Particles

Each test piece was mirror-finished, and electrolytically etched with an aqueous solution of potassium dichromate to turn MC carbide black. Using the above image analyzer, 20 arbitrary fields each corresponding to an area of 0.23 mm×0.25 mm in each test piece were observed to measure the average diameter (μm) of circles equivalent to the above MC carbide particles, and the measured values were averaged.

(5) Average Distance B Between MC Carbide Particles

Each test piece was mirror-finished, and its matrix was etched with a picric alcohol solution. In optical microscopic observation (200 times), the matrix appeared dark gray with light gray MC carbide and white carbides of $M_2C$, $M_6C$ and $M_7C_3$. 20 arbitrary fields each corresponding to an area of 1.0 mm×1.5 mm in each test piece were observed to measure the average distance (μm) between MC carbide particles, whose equivalent circles had diameters of 15 μm or more, and the measured values were averaged.

(6) Diameter BB of Maximum Circle Inscribed in Region Containing No MC Carbide Particles 20 arbitrary fields each corresponding to an area of 2.0 mm×3.0 mm in each test piece etched as in (4) were observed by an optical microscope (100 times) to measure the diameter (μm) of the maximum circle inscribed in each region containing no MC carbide particles, whose equivalent circles had diameters of 15 μm or more, and the measured values were averaged.

(7) Vickers Hardness of Matrix at Room Temperature

Each test piece was mirror-finished and lightly etched with a picric ethanol solution. Using a Vickers hardness test machine, the Vickers hardness (Hv) of the test piece was measured in a load range of 50-200 g at five arbitrary points, and the measured values were averaged.

(8) Wear Depth and Surface Roughness Rz

Figure 11:
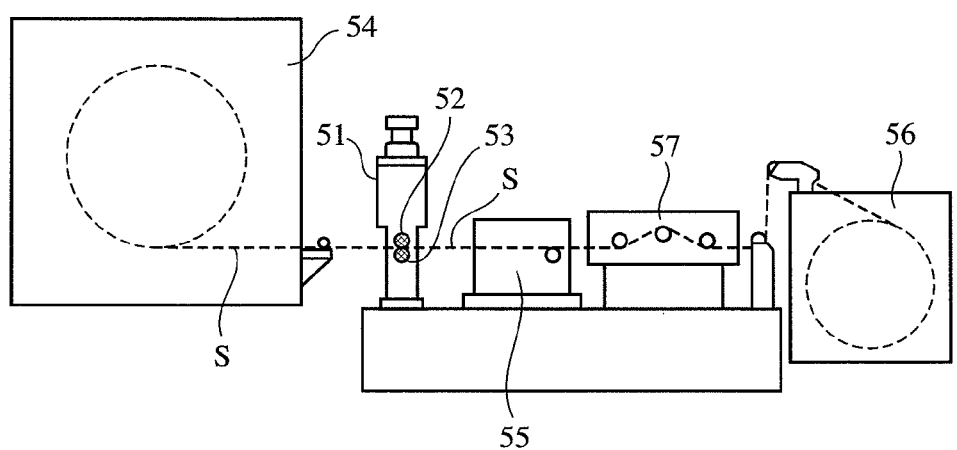
FIG. 11 is a schematic view showing a rolling-wear test machine.

To evaluate wear resistance and surface roughening resistance, using a rolling wear test machine schematically shown in FIG. 11, wear depth (μm) and ten-point average surface roughness Rz were measured on a roll used for rolling by the following methods. The surface roughness Rz was measured by a contact-stylus roughness meter.

The rolling wear test machine comprises a rolling mill 51 equipped with test rolls 52, 53 each constituted by a small sleeve roll of 60 mm in outer diameter, 40 mm in inner diameter and 40 mm in width, which was produced in Reference Examples 1-5, Comparative Examples 1-3, and Conventional Examples 1 and 2, a furnace 54, a cooling water bath 55, a reel 56, and a tension controller 57. The rolling wear test conditions were as follows:

| | |
|---|---|
| Rolled material S: | SUS304, |
| Rolling reduction ratio: | 25%, |
| Rolling speed: | 150 m/minute, |
| Rolling temperature: | 900° C., |
| Rolling distance: | 300 m, |
| Cooling of roll: | by water, and |
| Number of rolls: | 4 (4Hi). |

(9) Area Ratio of Seizure

Figure 22:
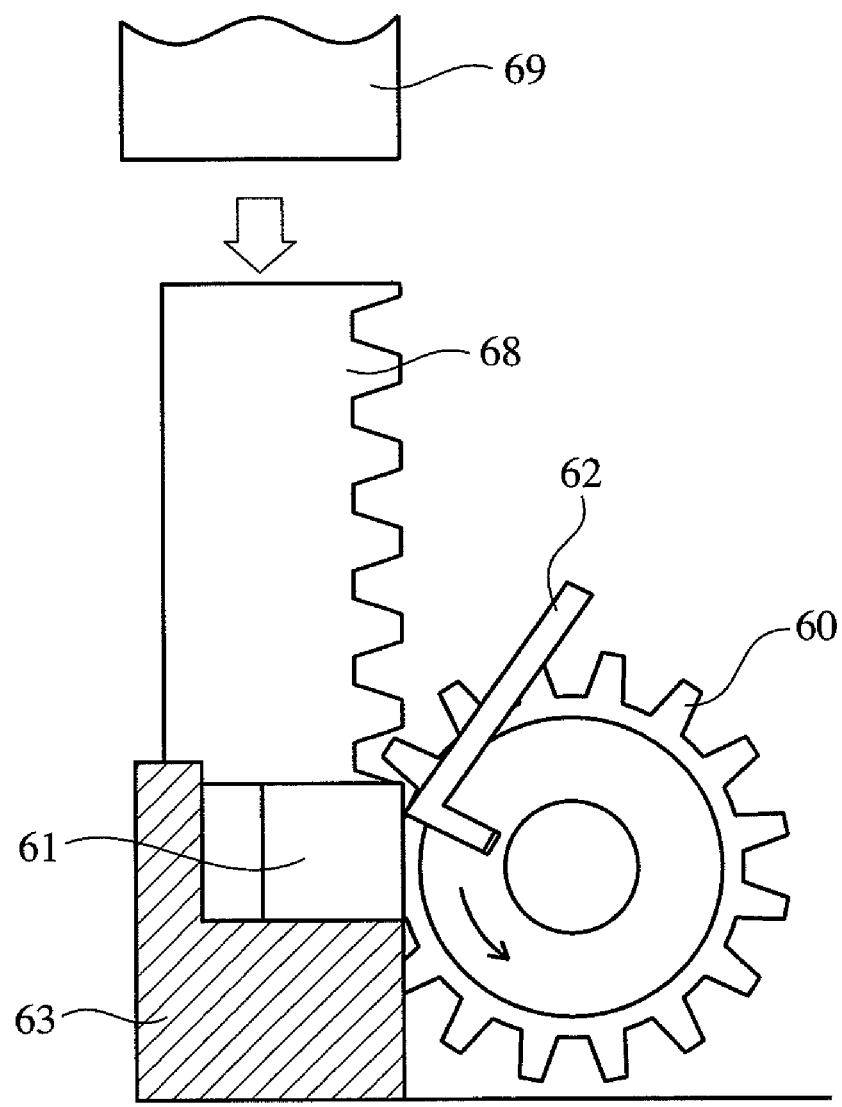
FIG. 22 is a schematic view showing a seizure test machine.

A seizure test machine schematically shown in FIG. 22 comprises a table 63 on which a test piece 61 is placed, a rack 68 whose lower end abuts an upper surface of the test piece 61, a pinion 60 engageable with the rack 68, a weight 69 falling onto the rack 68, and a seizure member 62 made of mild steel, which bites the test piece 61 by the rotation of the pinion 60. When the weight 69 of 100 kg falls onto the rack 68 in this test machine, the pinion 60 is rotated, so that the seizure member 62 is strongly pressed to the test piece 61. As a result, the test piece 61 is dented and seized with the member 62. An area ratio of seizure in the test piece 61 is calculated by (seizure area)/(dent area) (%). This seizure test was conducted twice on each test piece, and the measured seizure area ratios were averaged.

(10) Fracture Toughness KIC

The fracture toughness KIC of each test piece was measured according to ASTM E399. Measurement was conducted on two test pieces, and the measured values were averaged.

(11) Heat Cracking Test

Five cylindrical test pieces of 30 mm in diameter and 30 mm in length were cut out of each cylindrical body, and their circular end surfaces were mirror-polished to provide test pieces for a heat-cracking test. The circular end surface of each test piece was alternately immersed in a salt bath at 700° C. and water at 30° C. five times. Thereafter, the test piece was cut in a direction perpendicular to the circular end surface to measure the depth of heat cracks on the surface, and the measured values were averaged.

TABLE 3

| No. | V content[1] (% by mass) | $S_{MC}$[2] (% by area) | $S_{MC10}$[3] (% by area) | AA[4] (% by area) | BB[5] (μm) |
|---|---|---|---|---|---|
| Reference Example 1 | 56.8 | 38.3 | 34.5 | 0.8 | 65 |
| Reference Example 2 | 93.0 | 54.6 | 49.1 | 1.7 | 45 |
| Reference Example 3 | 77.1 | 32.9 | 28.0 | 0.0 | 90 |
| Reference Example 4 | 0.0 | 22.3 | 22.3 | 2.9 | 125 |
| Reference Example 5 | 41.6 | 23.2 | 20.9 | 0.4 | 140 |
| Comparative Example 1 | 91.2 | 26.8 | 26.8 | 0.2 | 210 |
| Comparative Example 2 | 89.3 | 8.9 | 5.6 | 0.0 | —[7] |
| Comparative Example 3 | 24.7 | 15.4 | 15.4 | 24.9 | 135 |
| Conventional Example 1 | 92.4 | 5.7 | 5.7 | 0.0[6] | —[7] |
| Conventional Example 2 | 78.0 | 7.4 | 4.9 | 8.5 | 550 |

| No. | Average Particle Distance B[8] (μm) | Average Equivalent-Circle Diameter A[9] (μm) | B/A | Matrix Hardness (Hv) | Wear Depth (μm) |
|---|---|---|---|---|---|
| Reference Example 1 | 26.0 | 20 | 1.3 | 698 | 1.4 |
| Reference Example 2 | 14.3 | 13 | 1.1 | 852 | 0.8 |
| Reference Example 3 | 49.6 | 31 | 1.6 | 663 | 1.9 |
| Reference Example 4 | 65.8 | 47 | 1.4 | 726 | 2.8 |
| Reference Example 5 | 32.3 | 17 | 1.9 | 644 | 2.3 |
| Comparative Example 1 | 61.6 | 22 | 2.8 | 675 | 4.0 |
| Comparative Example 2 | 17.2 | 4 | 4.3 | 426 | 9.3 |
| Comparative Example 3 | 84.7 | 11 | 7.7 | 712 | 4.1 |
| Conventional Example 1 | 32.4 | 6 | 5.4 | 570 | 13.0 |
| Conventional Example 2 | 52.0 | 8 | 6.5 | 659 | 5.1 |

| No. | Roughness Rz (μm) | Area Ratio of Seizure (%) | KIC (kg/mm$^{3/2}$) | Heat Crack Depth (mm) |
|---|---|---|---|---|
| Reference Example 1 | 3.2 | 47 | 75.4 | 2.6 |
| Reference Example 2 | 2.8 | 41 | 71.2 | 3.5 |
| Reference Example 3 | 3.7 | 51 | 76.8 | 3.8 |
| Reference Example 4 | 4.1 | 53 | 70.9 | 4.2 |
| Reference Example 5 | 4.3 | 59 | 77.4 | 2.1 |
| Comparative Example 1 | 6.1 | 71 | 73.7 | 4.8 |
| Comparative Example 2 | 4.2 | 87 | 82.9 | 3.3 |
| Comparative Example 3 | 5.8 | 45 | 63.2 | 4.0 |
| Conventional Example 1 | 4.5 | 39 | 72.4 | 5.2 |
| Conventional Example 2 | 4.9 | 63 | 70.6 | 4.6 |

Note:
[1] The V content in MC carbide.
[2] $S_{MC}$: The area ratio of MC carbide particles.
[3] $S_{MC10}$: The area ratio of MC carbide particles having equivalent-circle diameters of more than 10 μm.
[4] AA: The total area ratio of carbides of $M_2C$, $M_6C$ and $M_7C_3$, whose equivalent circles had diameters of 1 μm or more.
[5] BB: The diameter of the maximum circle inscribed in a region containing no MC carbide particles having equivalent-circle diameters of 15 μm or more.
[6] Containing 28.6% by area of $M_3C$.
[7] There were no MC carbide particles having equivalent-circle diameters of 15 μm or more.
[8] Average distance between MC carbide particles having equivalent-circle diameters of 15 μm or more.
[9] Average equivalent-circle diameter of MC carbide particles.

Figure 12:
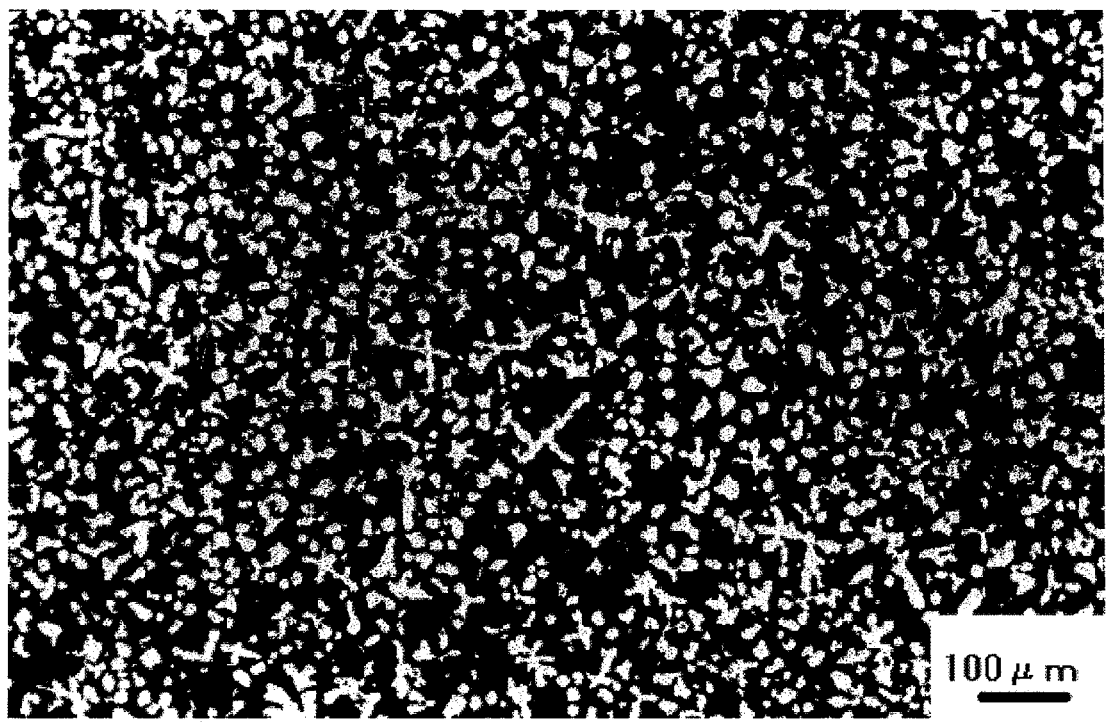
FIG. 12 is an optical photomicrograph showing the metal structure of the test piece of Reference Example 1.
Figure 13:
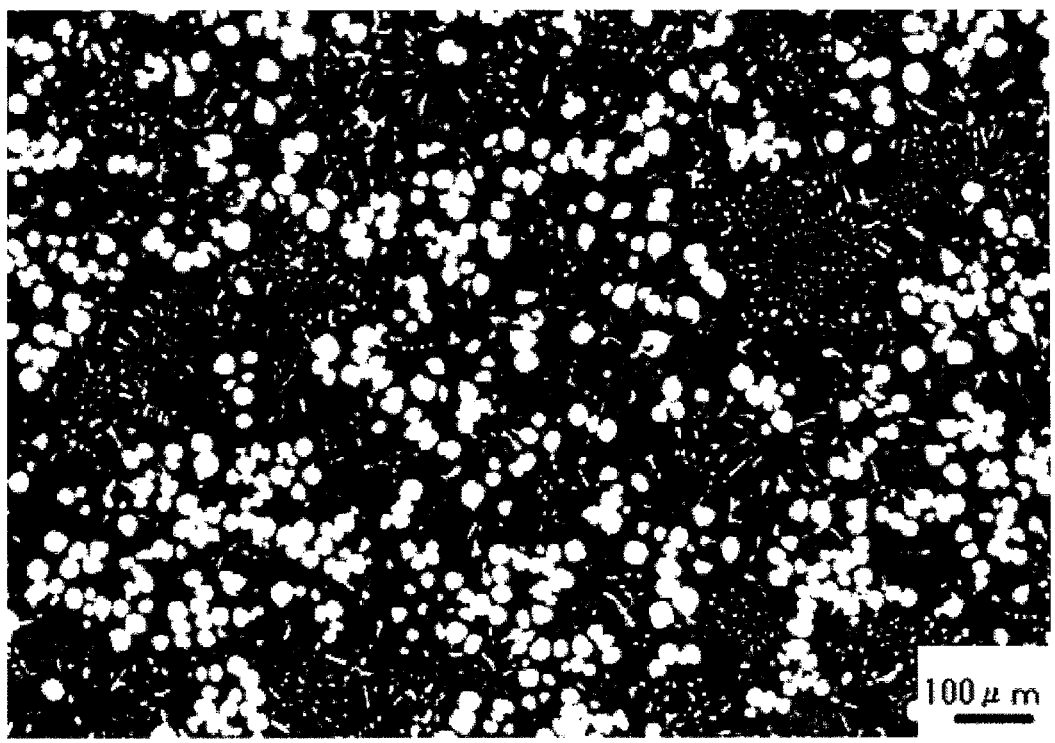
FIG. 13 is an optical photomicrograph showing the metal structure of the test piece of Comparative Example 1.

FIG. 12 shows the metal structure of the test piece of Reference Example 1, and FIG. 13 shows the metal structure of the test piece of Comparative Example 1. In FIGS. 12 and 13, white portions are MC carbide particles, and a black portion is the matrix. In the test piece of Reference Example 1, MC carbide particles were uniformly distributed at a high concentration. In the test piece of Comparative Example 1, MC carbide particles were at a high concentration, but with uneven distribution.

Figure 14:
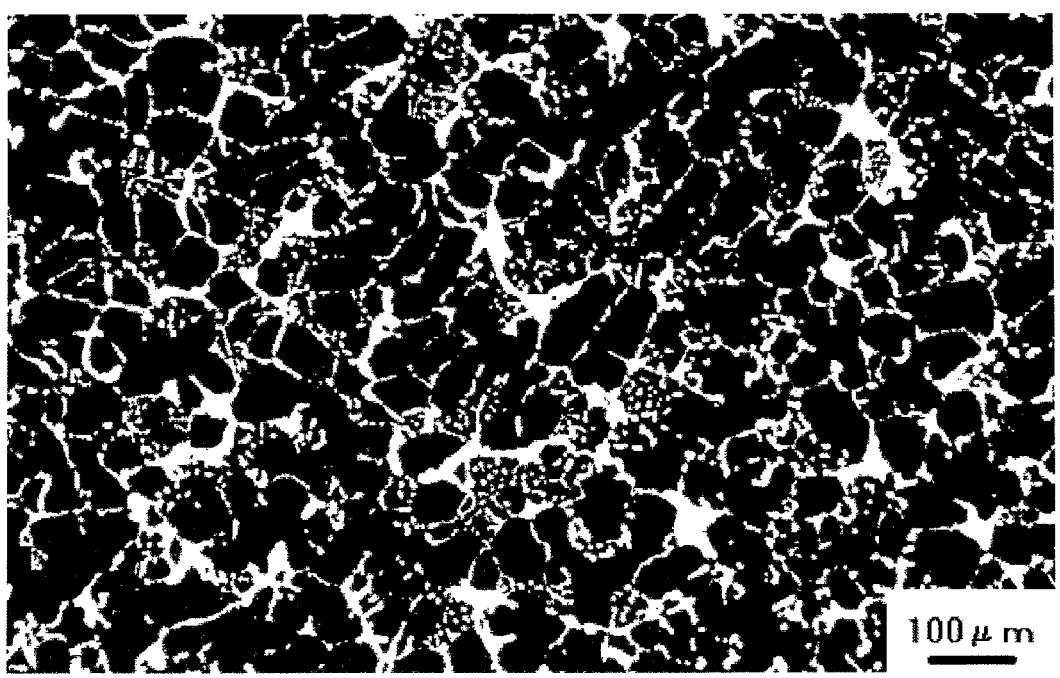
FIG. 14 is an optical photomicrograph showing the metal structure of the test piece of Conventional Example 2.

FIG. 14 shows the metal structure of the high-speed steel roll of Conventional Example 2. Fine granular white portions are MC carbide particles, white network portions are carbides of $M_2C$, $M_6C$ and $M_7C_3$, and a black portion is the matrix. In the roll of Conventional Example 2, MC carbide particles were partially segregated, and the carbides of $M_2C$, $M_6C$ and $M_7C_3$ were distributed in a network manner.

The wear depth in Reference Examples 1-5 was substantially half or less of that of Conventional Examples 1 and 2, indicating that the former had excellent wear resistance. Also, Reference Examples 1-5 were much better than Conventional Example 2 in any of surface roughening resistance, seizure resistance and toughness.

Figure 15:
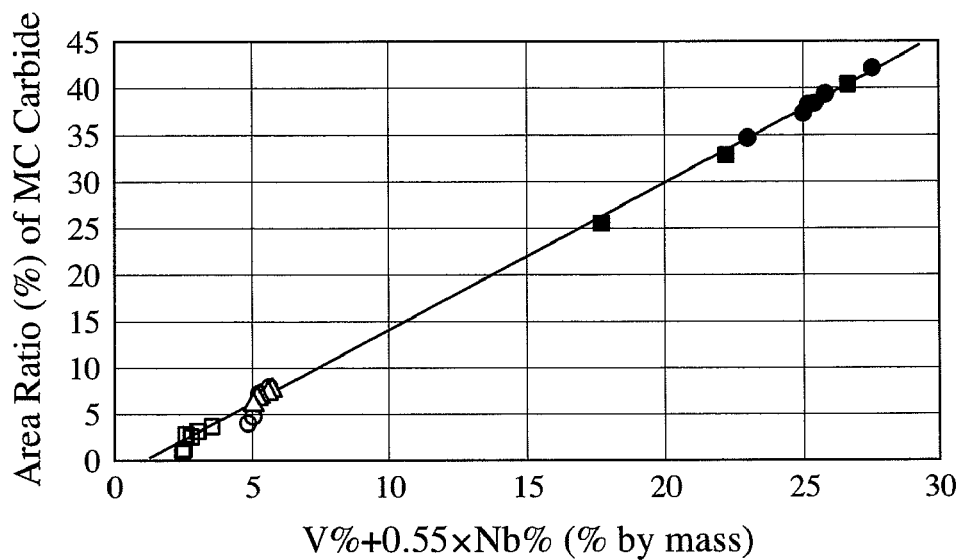
FIG. 15 is a graph showing the relation between the value of (V %+0.55×Nb %) and the area ratio of MC carbide particles.

FIG. 15 shows the relation between the area ratio of MC carbide particles and the value of the formula (a): [V %+0.55× Nb %]. It was found that their relation was substantially linear, and that when X was about 15% or more by mass, the area ratio of MC carbide particles was about 20% or more.

In the test piece of Comparative Example 1, the diameter BB of a circle inscribed in a region containing no MC carbide particles having equivalent-circle diameters of 15 μm or more exceeded 150 μm, and a ratio B/A exceeded 2, wherein B is an average distance between MC carbide particles having equivalent-circle diameters of 15 μm or more, and A is an average equivalent-circle diameter of MC carbide particles. The test piece was thus poor in surface roughening resistance.

In Comparative Example 2, the C content, the value Y of the formula (b), the area ratio of MC carbide particles, and the average equivalent-circle diameter of MC carbide particles were outside the ranges of the present invention, and the B/A exceeded 2. It was thus poor in wear resistance and seizure resistance.

In Comparative Example 3, the V content, the values X and Y of the formulae (a) and (b), the area ratio of MC carbide particles, and the total area ratio AA of carbides of $M_2C$, $M_6C$ and $M_7C_3$ were outside the ranges of the present invention, and the B/A exceeded 2. Also, Comparative Example 3 had larger surface roughness Rz and smaller KIC than those of Conventional Examples 1 or 2. It was thus poor in surface roughening resistance and toughness.

In Conventional Example 1, the V content, the value X of the formula (a), the area ratio of MC carbide particles, and the average equivalent-circle diameter of MC carbide particles were outside the ranges of the present invention, and the B/A exceeded 2. It was thus poor in wear resistance.

In Conventional Example 2, the V content and the value X of the formula (a) were outside the ranges of the present invention. It was thus poor in wear resistance.

REFERENCE EXAMPLES 6-10, AND COMPARATIVE EXAMPLES 4-6

The chemical components (% by mass) of intermediate layer melts of Reference Examples and Comparative Examples are shown in Table 4.

TABLE 4

| No. | C | Si | Mn | V | Nb | Cr | Mo | W | Ni | Co | Ti | Al |
|---|---|---|---|---|---|---|---|---|---|---|---|---|
| Reference Example 6 | 1.6 | 0.8 | 0.3 | 2.7 | — | 3.7 | 2.0 | — | 0.3 | — | — | — |
| Reference Example 7 | 2.0 | 0.2 | 0.2 | 3.6 | — | 0.9 | 4.9 | — | — | — | — | — |
| Reference Example 8 | 0.4 | 0.2 | 1.3 | 0.1 | — | — | 1.1 | 0.3 | — | — | — | — |
| Reference Example 9 | 1.8 | 0.6 | 0.6 | — | 0.8 | 7.9 | 1.5 | 4.7 | — | — | — | — |
| Reference Example 10 | 1.0 | 0.3 | 0.4 | — | — | 5.4 | 1.2 | — | — | — | — | 0.04 |
| Comparative Example 4 | 0.2 | 1.5 | 0.2 | — | — | — | — | — | — | — | — | — |
| Comparative Example 5 | 2.0 | 0.2 | 0.5 | — | — | 15.0 | 1.3 | 7.8 | 1.2 | — | — | — |
| Comparative Example 6 | 2.3 | 0.8 | 0.3 | 1.3 | — | 4.1 | 8.4 | — | 0.1 | — | — | — |

EXAMPLE 1

After the outer layer melt of Reference Example 1 shown in Table 1 was centrifugally cast using a mold having an inner diameter of 450 mm and a length of 800 mm, the intermediate layer melt of Reference Example 6 shown in Table 4 was charged into the resultant outer layer. The resultant cylindrical body comprising an outer layer and an intermediate layer was taken out of the centrifugally casting mold, and a spheroidal graphite cast iron melt comprising by mass 3.3% of C, 1.8% of Si, 0.4% of Mn, 0.4% of Cr, 0.5% of Mo, and 2.2% of Ni, the balance being substantially Fe and inevitable impurities, was charged into the intermediate layer by a stationarily casting method, to form an inner layer, thereby obtaining a composite roll precursor. An MC-carbide-poor portion [an MC-carbide-poor outside layer 40b and a layer 40c having a gradually changing area ratio of MC carbide particles shown in FIGS. 4(b) and 4(c)] was removed from a body surface of this composite roll precursor by machining, to obtain a composite roll having a body diameter of 310 mm and a body length of 500 mm, which was hardened and annealed.

EXAMPLE 2

A composite roll was produced in the same manner as in Example 1 except for using the outer layer melt of Reference Example 2 shown in Table 1 and the intermediate layer melt of Reference Example 7 shown in Table 4.

EXAMPLE 3

A composite roll was produced in the same manner as in Example 1 except for using the outer layer melt of Reference Example 3 shown in Table 1 and the intermediate layer melt of Reference Example 8 shown in Table 4.

EXAMPLE 4

A composite roll was produced in the same manner as in Example 1 except for using the outer layer melt of Reference Example 4 shown in Table 1 and the intermediate layer melt of Reference Example 9 shown in Table 4.

EXAMPLE 5

A composite roll was produced in the same manner as in Example 1 except for using the outer layer melt of Reference Example 5 shown in Table 1 and the intermediate layer melt of Reference Example 10 shown in Table 4.

COMPARATIVE EXAMPLE 7

A composite roll was produced in the same manner as in Example 1 except for using the outer layer melt of Reference Example 1 shown in Table 1 and the intermediate layer melt of Comparative Example 4 shown in Table 4.

COMPARATIVE EXAMPLE 8

A composite roll was produced in the same manner as in Example 1 except for using the outer layer melt of Reference Example 1 shown in Table 1 and the intermediate layer melt of Comparative Example 5 shown in Table 4.

COMPARATIVE EXAMPLE 9

A composite roll was produced in the same manner as in Example 1 except for using the outer layer melt of Reference Example 1 shown in Table 1 and the intermediate layer melt of Comparative Example 6 shown in Table 4.

COMPARATIVE EXAMPLE 10

A composite roll was produced in the same manner as in Example 1 except that an intermediate layer was not formed.

COMPARATIVE EXAMPLE 11

After the outer layer melt of Conventional Example 2 shown in Table 1 was centrifugally cast, a spheroidal graphite cast iron melt comprising by mass 3.3% of C, 1.8% of Si, 0.4% of Mn, 0.4% of Cr, 0.5% of Mo, and 2.2% of Ni, the balance being substantially Fe and inevitable impurities, was charged into the resultant outer layer by a stationarily casting method to form an inner layer, thereby producing a composite roll. An intermediate layer was not formed.

A disc-shaped sample including an outer layer, an intermediate layer and an inner layer was cut out of a body center portion of each composite roll of Examples 1-5 and Comparative Examples 7-11 by machining. Test pieces were cut out of each sample.

Table 5 shows the compositions of intermediate layers of the composite rolls. As is clear from Table 5, the composition of the intermediate layer melt was not the same as that of the intermediate layer per se. X, Y and Z in Table 5 represent the values of the formula (a): [V %+0.55×Nb %], the formula (b): [C %−0.2×(V %+0.55×Nb %)], and the formula (c): [Mo %+(W %/2)], in the intermediate layer.

Test pieces obtained from the composite rolls of Examples 1-5 and Comparative Examples 7-9 were examined with respect to the state of a boundary between an outer layer and an intermediate layer. Also, the intermediate layers were measured with respect to thickness and a matrix structure.

A test piece was cut out of each composite roll of Examples 1-5 and Comparative Examples 7-9 in a radial direction, with a boundary between an outer layer and an intermediate layer as a center, and subjected to a tensile test. The tensile test was conducted twice on each sample, and the measured values were averaged. Further, the position of fracture after the tensile test was examined.

A test piece obtained from each composite roll of Comparative Examples 10 and 11 was examined with respect to the state of a boundary between an outer layer and an inner layer, and the matrix structure of the inner layer.

A test piece was also cut out of each composite roll of Comparative Examples 10 and 11 in a radial direction, with a boundary between an outer layer and an inner layer as a center, and subjected to a tensile test. The tensile test was conducted twice on each sample, and the measured values were averaged. Further, the position of fracture after the tensile test was examined. The above measurement results are shown in Table 5.

In Table 5, the wear depth of each composite roll of Examples 1-5 and Comparative Examples 7-11 is the test result of each corresponding outer layer.

TABLE 5

| No. | Melt for Outer Layer | Melt for Intermediate Layer No. | Melt for Intermediate Layer Material | Composition of Intermediate Layer (% by mass) | | | | |
|---|---|---|---|---|---|---|---|---|
| | | | | C | Si | Mn | V | Nb |
| Example 1 | Reference Example 1 | Reference Example 6 | High-Speed Steel | 2.2 | 0.9 | 0.4 | 5.2 | — |
| Example 2 | Reference Example 2 | Reference Example 7 | High-Speed Steel | 2.8 | 0.2 | 0.2 | 7.1 | — |
| Example 3 | Reference Example 3 | Reference Example 8 | High-Speed Steel | 0.8 | 0.2 | 1.4 | 2.1 | 0.4 |
| Example 4 | Reference Example 4 | Reference Example 9 | High-Speed Steel | 2.2 | 0.6 | 0.6 | — | 2.8 |
| Example 5 | Reference Example 5 | Reference Example 10 | High-Speed Steel | 1.3 | 0.4 | 0.4 | 1.5 | — |
| Comparative Example 7 | Reference Example 1 | Comparative Example 4 | Cast Steel | 0.4 | 1.5 | 0.2 | 0.2 | — |
| Comparative Example 8 | Reference Example 1 | Comparative Example 5 | High-Chromium | 3.2 | 0.4 | 0.6 | 1.2 | — |
| Comparative Example 9 | Reference Example 1 | Comparative Example 6 | High-Speed Steel | 2.9 | 0.9 | 0.4 | 3.8 | — |
| Comparative Example 10 | Reference Example 1 | — | — | — | — | — | — | — |
| Comparative Example 11 | Conventional Example 2 | — | — | — | — | — | — | — |

TABLE 5-continued

| No. | Composition of Intermediate Layer (% by mass) | | | | | | | $X^{(1)}$ | $Y^{(2)}$ | $Z^{(3)}$ |
|---|---|---|---|---|---|---|---|---|---|---|
| | Cr | Mo | W | Ni | Co | Ti | Al | | | |
| Example 1 | 4.1 | 2.5 | 2.3 | 0.3 | — | — | — | 5.2 | 1.2 | 3.7 |
| Example 2 | 1.1 | 5.8 | — | — | 0.5 | 0.02 | — | 7.1 | 1.4 | 5.8 |
| Example 3 | — | 1.4 | 0.8 | — | — | — | — | 2.3 | 0.3 | 1.8 |
| Example 4 | 8.9 | 1.7 | 4.8 | — | — | — | — | 1.5 | 1.9 | 4.1 |
| Example 5 | 6.3 | 1.2 | 1.5 | 0.1 | — | — | 0.05 | 1.6 | 1.0 | 2.0 |
| Comparative Example 7 | 0.1 | 0.1 | 1.3 | — | — | — | — | 0.2 | 0.4 | 0.8 |
| Comparative Example 8 | 15.9 | 2.4 | 12.4 | 1.2 | — | — | — | 1.2 | 3.0 | 8.6 |
| Comparative Example 9 | 4.5 | 8.9 | 2.3 | 0.1 | — | — | — | 3.8 | 2.1 | 10.1 |
| Comparative Example 10 | — | — | — | — | — | — | — | — | — | — |
| Comparative Example 11 | — | — | — | — | — | — | — | — | — | — |

Note:
$^{(1)}$X is the value of the formula (a): [V % + 0.55 × Nb %] in the intermediate layer.
$^{(2)}$Y is the value of the formula (b): [C % − 0.2 × (V % + 0.55 × Nb %)] in the intermediate layer.
$^{(3)}$Z is the value of the formula (c): [Mo % + (W %/2)] in the intermediate layer.

| No. | Intermediate Layer | | | Inner Layer |
|---|---|---|---|---|
| | Thickness (mm) | Matrix Structure$^{(1)}$ | Area Ratio$^{(2)}$ (%) | Matrix Structure$^{(1)}$ |
| Example 1 | 35 | B + M | 100 | P |
| Example 2 | 40 | M | 100 | P |
| Example 3 | 60 | B + P | 93 | P |
| Example 4 | 50 | M + P | 78 | P |
| Example 5 | 45 | B | 100 | P |
| Comparative Example 7 | 30 | P + B | 25 | P |
| Comparative Example 8 | 15 | M | 100 | P |
| Comparative Example 9 | 4 | B + M | 100 | P |
| Comparative Example 10 | — | — | 0 | P |
| Comparative Example 11 | — | — | 0 | P |

| No. | Boundary$^{(3)}$ | | | Wear Depth (μm) |
|---|---|---|---|---|
| | Tensile Strength (MPa) | State$^{(4)}$ | Position of Fracture | |
| Example 1 | 628 | Good | In outer layer | 1.4 |
| Example 2 | 497 | Good | In intermediate layer | 0.8 |
| Example 3 | 584 | Good | In outer layer | 1.9 |
| Example 4 | 551 | Good | In outer layer | 2.8 |
| Example 5 | 524 | Good | In outer layer | 2.5 |
| Comparative Example 7 | 160 | Poorly melt-bonded | In boundary | 1.4 |
| Comparative Example 8 | 204 | Carbide aggregated | In boundary | 1.4 |
| Comparative Example 9 | 274 | Good | In intermediate layer | 1.4 |
| Comparative Example 10 | 151 | Carbide aggregated | In boundary | 1.4 |
| Comparative Example 11 | 456 | Good | In outer layer | 5.1 |

Note:
$^{(1)}$B: bainite, M: martensite, P: pearlite.
$^{(2)}$An area ratio of B (bainite) and/or M (martensite).
$^{(3)}$In a boundary between an outer layer and an intermediate layer in Examples 1-5 and Comparative Examples 7-9, and in a boundary between an outer layer and an inner layer in Comparative Example 10.

As is clear from Table 5, the composite rolls of Examples 1-5 had as high tensile strength as 480 MPa or more between the outer layer and the intermediate layer, and they were well melt-bonded. The matrix structures of the intermediate layers of Examples 1-5 were based on bainite (B), martensite (M), or a mixture thereof (B+M) at area ratios of 70% or more.

Figure 23A:
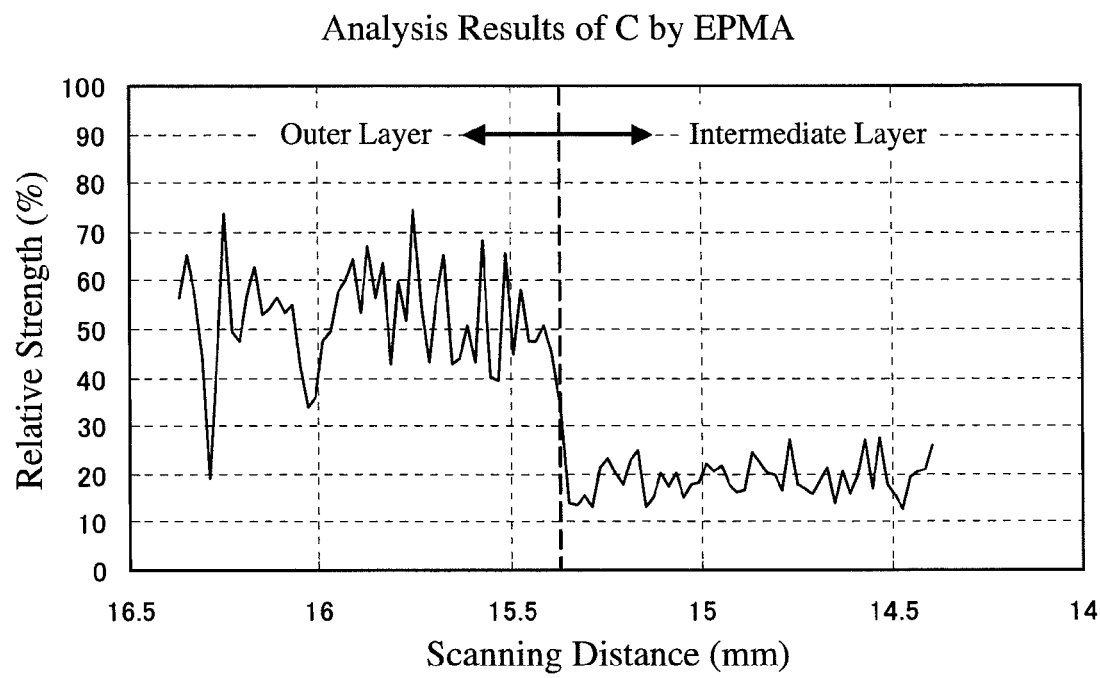
FIG. 23(a) is a graph showing the distribution of C in and around a bonding boundary between an outer layer and an intermediate layer in the centrifugally cast composite roll of Example 1.
Figure 23B:
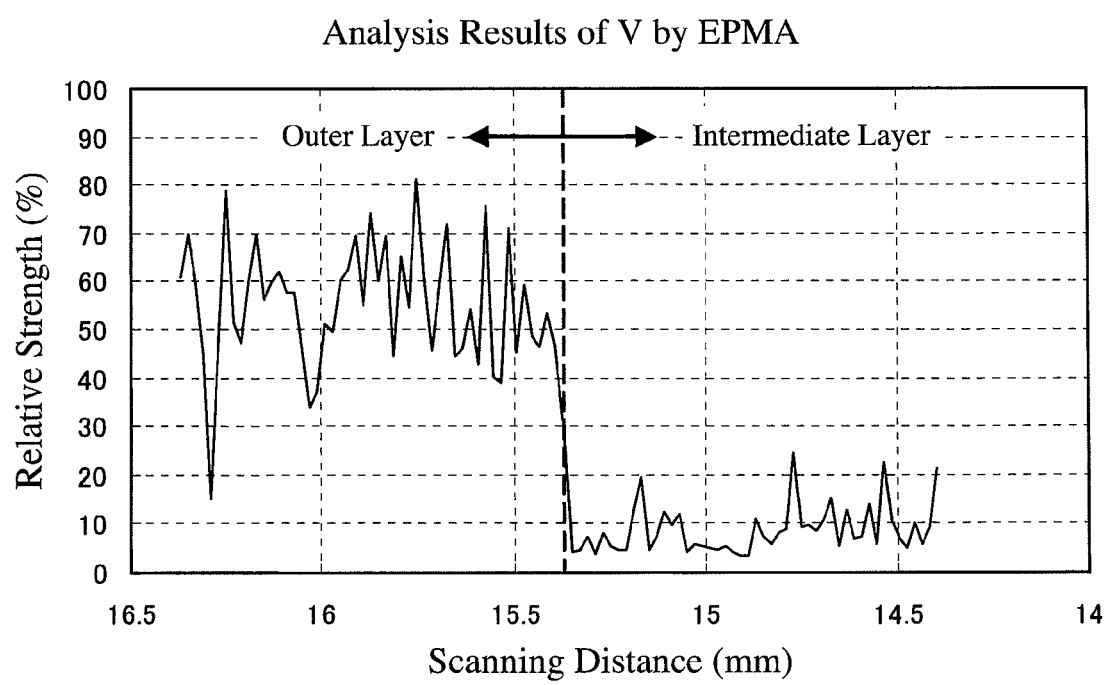
FIG. 23(b) is a graph showing the distribution of V in and around a bonding boundary between an outer layer and an intermediate layer in the centrifugally cast composite roll of Example 1.

FIGS. 23(a) and 23(b) show the element analysis results by EPMA (acceleration voltage of 20 kV, and beam diameter of 100×1 μm) in the boundary between the outer layer and the intermediate layer in Example 1. As is clear from FIGS. 23(a) and 23(b), the concentrations of C and V drastically changed in the boundary between the outer layer and the intermediate layer.

The composite roll of Comparative Example 7 having an intermediate layer made of cast steel contained many voids in the boundary, indicating poor melt-bonding. In the intermediate layer, the contents of C and Mo, the value X of the formula (a): [V %+0.55×Nb %], and the value Z of the formula (c): [Mo %+(W %/2)] were outside the desired ranges of the present invention. There was only 25% by area of a bainite structure in the matrix of the intermediate layer, outside the range of the present invention. Accordingly, the composite roll of Comparative Example 7 suffered such production trouble that part of the outer layer spalled after heat treatment, and had an extremely low tensile strength as 160 MPa between the outer layer and the intermediate layer.

The composite roll of Comparative Example 8 having a intermediate layer made of high-chromium cast iron contained a large amount of carbide in the boundary. In this intermediate layer, the contents of C and Cr, the value Y of the formula (b): [C %−0.2×(V %+0.55×Nb %)], and the value Z of the formula (c): [Mo %+(W %/2)] were outside the desired ranges of the present invention. Also, tensile strength between the outer layer and the intermediate layer was as low as 204 MPa.

The composite roll of Comparative Example 9 having an intermediate layer made of high-speed steel had as thin an intermediate layer as 4 mm, outside the range of the present invention. In this intermediate layer, the Mo content and the value Z of the formula (c): [Mo %+(W %/2)] were outside the desired ranges of the present invention. Also, tensile strength between the outer layer and the intermediate layer was as low as 274 MPa.

The composite roll of Comparative Example 10 having an inner layer formed directly inside an outer layer without an intermediate layer contained a large amount of carbide in the boundary between the outer layer and the inner layer. Accordingly, it suffered such production trouble that part of the outer layer spalled after casting. Also, tensile strength between the outer layer and the inner layer was as low as 151 MPa, causing fracture in the boundary.

The composite roll of Comparative Example 11 had an inner layer formed directly inside the outer layer of Conventional Example without an intermediate layer. There was good bonding between the outer layer and the inner layer, with as high tensile strength as 456 MPa. However, the outer layer of Conventional Example had poor wear resistance.

Figure 16:
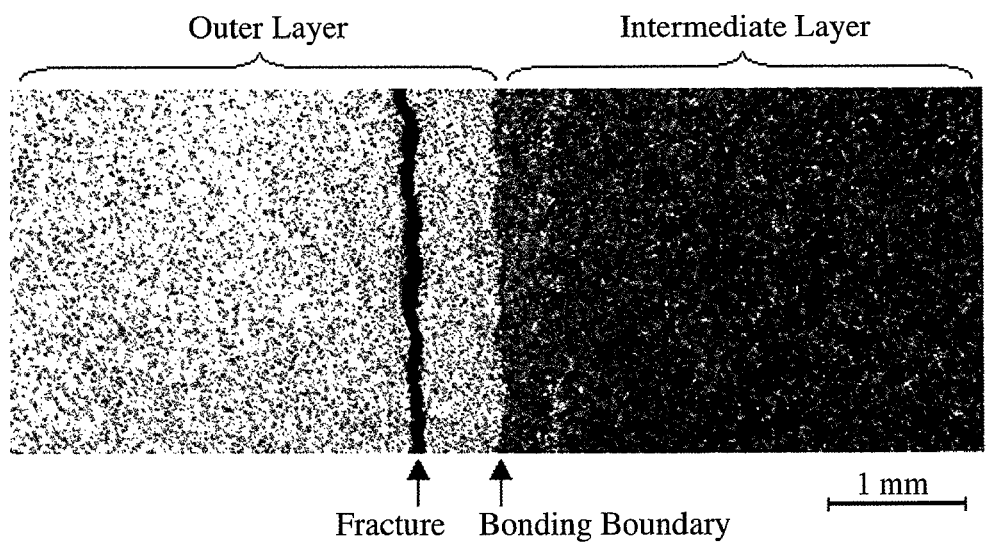
FIG. 16 is a photomicrograph showing the cross section structure of the centrifugally cast composite roll of Example 1 after a tensile test.

The test piece of Example 1 was etched with a picric ethanol solution for microscopic observation. The results are shown in FIG. 16. It is clear from FIG. 16 that the composite roll of Example 1 did not have voids or a layer of aggregated carbide in a boundary between an outer layer and an intermediate layer, that fracture occurred in the outer layer, and that the matrix structure of the intermediate layer was constituted by a mixture of bainite and martensite.

Figure 17:
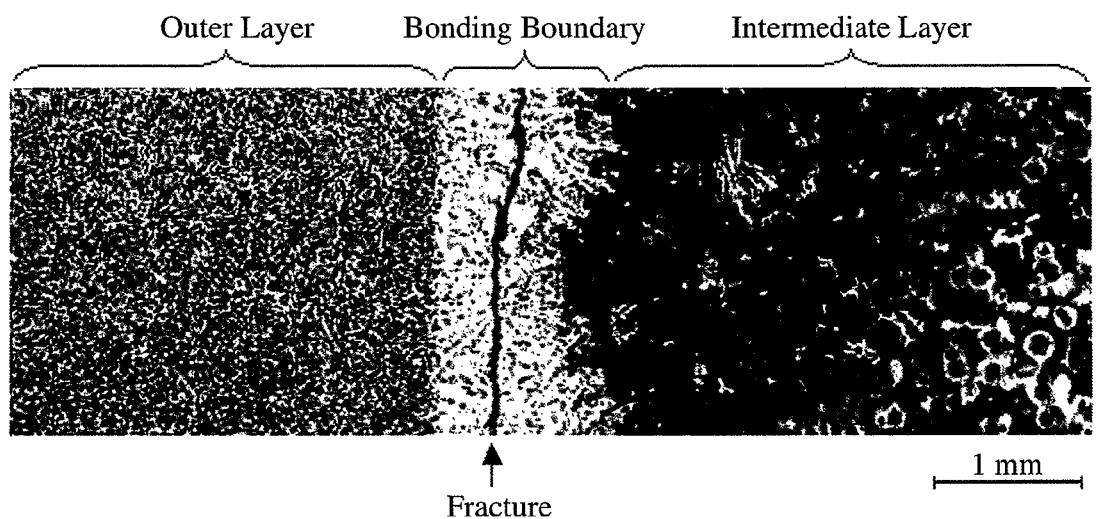
FIG. 17 is a photomicrograph showing the cross section structure of the centrifugally cast composite roll of Comparative Example 10 after a tensile test.

The test piece of Comparative Example 10 was etched with an aqueous solution of ammonium persulfate for microscopic observation. The results are shown in FIG. 17. It is clear from FIG. 17 that the composite roll of Comparative Example 10 had a layer of aggregated carbide in a boundary between an outer layer and an intermediate layer, so that fracture occurred in the weak boundary.

Figure 18:
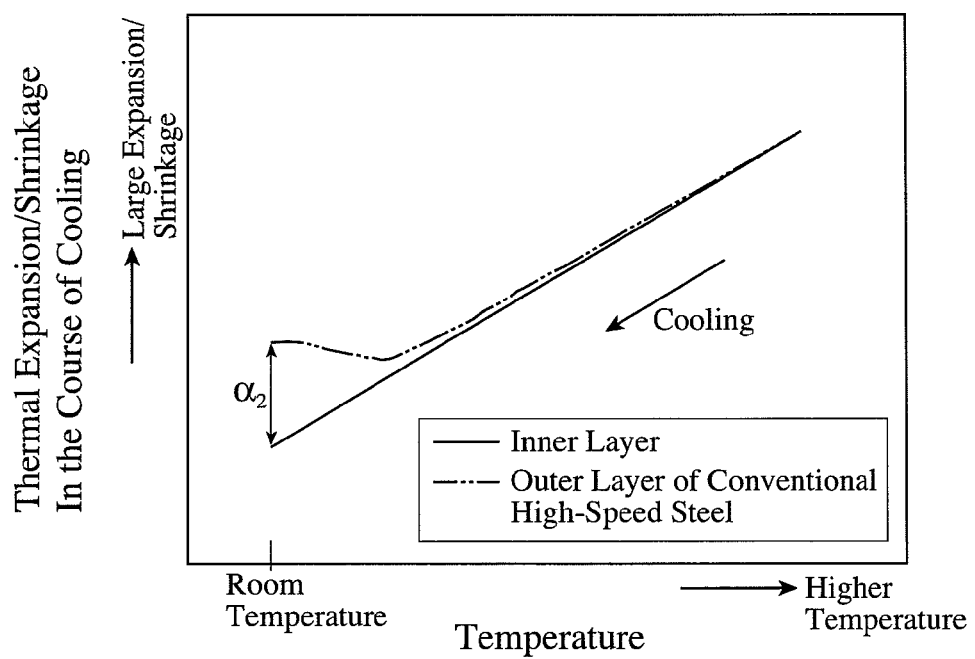
FIG. 18 is a graph schematically showing the thermal expansion/shrinkage curve of the centrifugally cast composite roll of Comparative Example 11 in the course of cooling during hardening.

FIG. 18 schematically shows a thermal expansion/shrinkage curve of the composite roll of Comparative Example 11 in the course of cooling during hardening. In Comparative Example 11, a martensitic or bainitic transformation occurred in the outer layer in the cooling process, to cause thermal expansion and shrinkage (simply called "thermal expansion"), resulting in expansion difference $\alpha_2$ between the outer layer and the inner layer. The expansion difference $\alpha_2$ was such a level as to cause no spalling of the outer layer. The use of a conventional outer layer provides a centrifugally cast composite roll having poor wear resistance, but good bonding between the outer layer and the inner layer.

Figure 19:
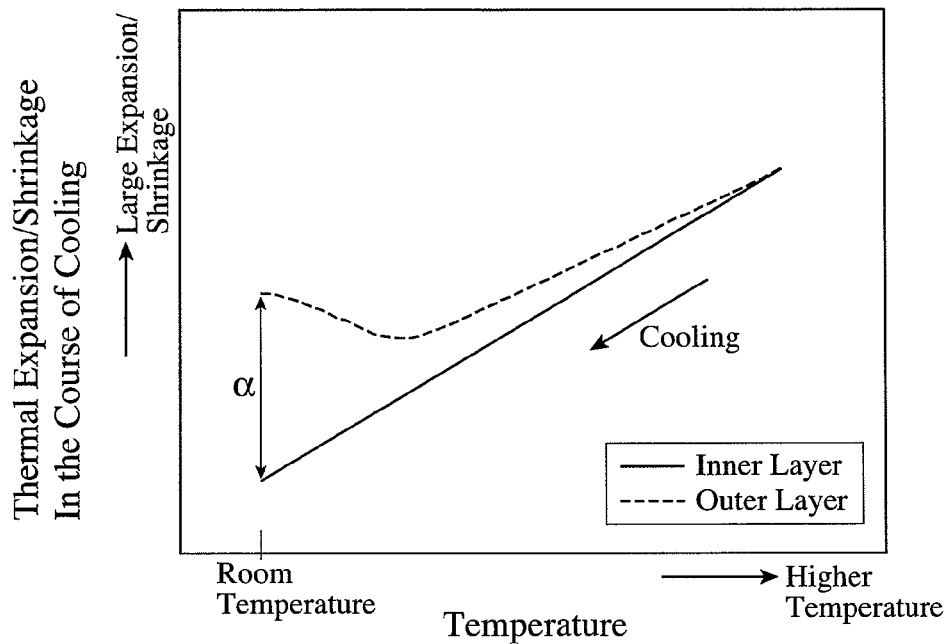
FIG. 19 is a graph schematically showing the thermal expansion/shrinkage curve of the centrifugally cast composite roll of Comparative Example 10 in the course of cooling during hardening.

FIG. 19 schematically shows a thermal expansion/shrinkage curve of the composite roll of Comparative Example 10 in the course of cooling during hardening. In Comparative Example 10, the outer layer was subjected to martensitic or bainitic transformation in the cooling process, resulting in small thermal expansion. On the other hand, the inner layer was subjected to pearlitic transformation, resulting in large thermal expansion. As a result, there was a large expansion difference $\alpha$ between the outer layer and the inner layer. Accordingly, the spalling of the outer layer was likely to occur in the course of cooling during hardening, making it difficult to centrifugally cast a good composite roll.

Figure 20:
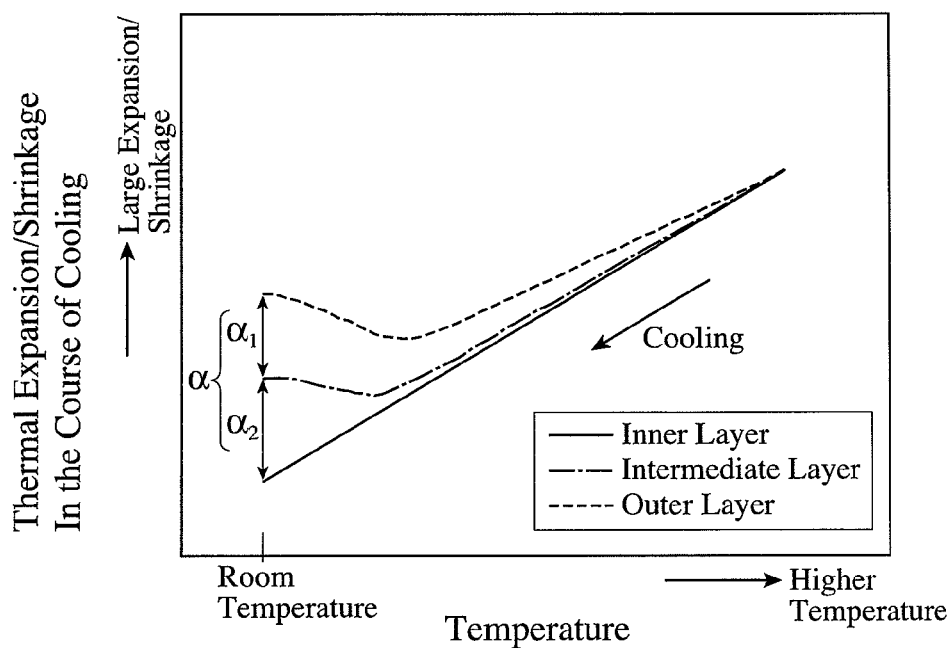
FIG. 20 is a graph schematically showing the thermal expansion/shrinkage curve of the centrifugally cast composite roll of Example 1 in the course of cooling during hardening.

FIG. 20 schematically shows a thermal expansion/shrinkage curve of the composite roll of Example 1 in the course of cooling during hardening. Although Example 1 was substantially the same as Comparative Example 10 in the expansion difference a between the outer layer and the inner layer in the cooling process, the intermediate layer of Example 1 constituted by a mixture of bainite and martensite had thermal expansion at an intermediate level between those of the outer layer and the inner layer, so that the expansion difference $\alpha_1$ between the outer layer and the intermediate layer was smaller than a by the expansion difference $\alpha_2$ between the intermediate layer and the inner layer. Thus, the formation of the intermediate layer reduces expansion difference between the outer layer and the inner layer, thereby preventing the spalling of the outer layer in the course of cooling during hardening to centrifugally cast a good composite roll.

The centrifugally cast composite rolls of Examples 1-5 exhibited excellent wear resistance, surface roughening resistance and spalling resistance in the rolling of stainless steel.

Figure 21:
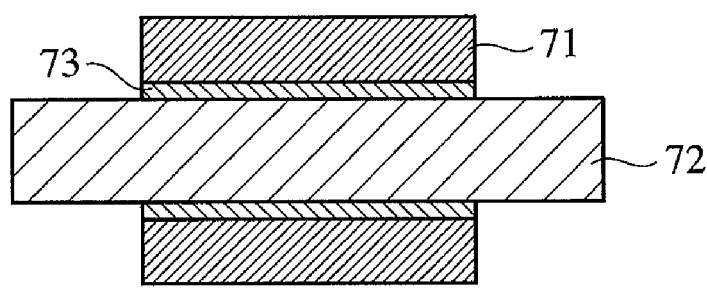
FIG. 21 is a schematic cross-sectional view showing various structures of the centrifugally cast composite roll of the present invention.
Figure 21:
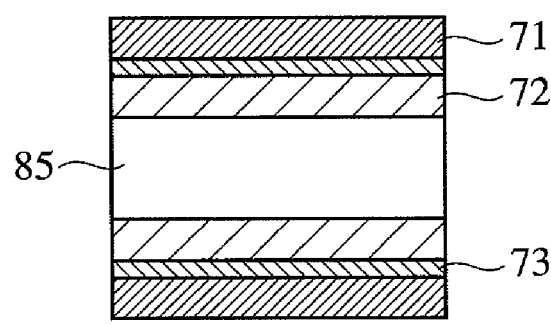
Figure 21:
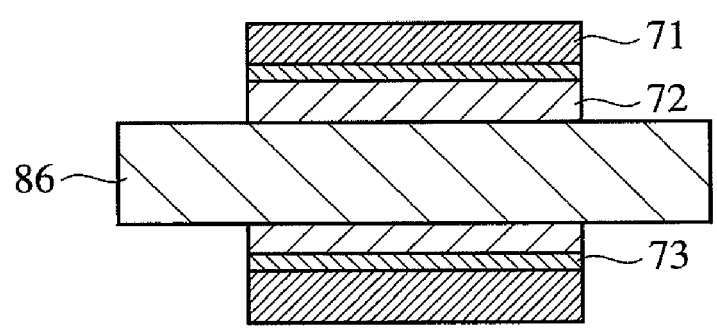

FIG. 21 shows various examples of the structure of the centrifugally cast composite roll of the present invention. (a) shows a solid composite roll comprising an outer layer 71, an intermediate layer 73 and an inner layer 72, (b) shows a hollow sleeve roll comprising an outer layer 71, an intermediate layer 73, and an inner layer 72, which has a hollow portion 85, and (c) shows a composite roll constituted by inserting a metal shaft 86 into the hollow sleeve roll (b).

Effect of the Invention

The centrifugally cast composite roll of the present invention exhibits excellent wear resistance and seizure resistance when used as a work roll for rolling, particularly as a work roll at a finishing train of a hot strip mill. Further, because it has excellent spalling resistance of an outer layer, it contributes to the improvement of productivity in rolling factories and the reduction of rolling cost.

What is claimed is:

1. A centrifugally cast composite roll comprising an outer layer having a composition comprising by mass 2.5-9% of C, 0.1-3.5% of Si, 0.1-3.5% of Mn, and 11-40% of V, the balance being Fe and inevitable impurities; an intermediate layer made of a high-speed steel alloy, which is formed inside said outer layer; and an inner layer made of cast iron or steel, which is formed inside said intermediate layer.

2. The centrifugally cast composite roll according to claim 1, wherein 20-60% by area of MC carbide particles are dispersed in said outer layer.

3. The centrifugally cast composite roll according to claim 1, wherein said intermediate layer has a composition comprising by mass 0.5-3% of C, 0.1-3% of Si, 0.1-3% of Mn, 1-10% of V, and Mo and W satisfying the following formula (1):

$$1\% \leq Mo\% + (W\%/2) \leq 6\% \text{ (by mass)} \quad (1),$$

the balance being Fe and inevitable impurities.

4. The centrifugally cast composite roll according to claim 3, wherein at least part of V in said intermediate layer is substituted by Nb in an amount satisfying the following formulae (2) and (3):

$$1\% \leq V\% + 0.55 \times Nb\% \leq 10\% \text{ (by mass)} \quad (2), \text{ and}$$

$$Nb \leq 6\% \text{ (by mass)} \quad (3).$$

5. The centrifugally cast composite roll according to claim 4, wherein said intermediate layer further meets the following formula (4):

$$0.3\% \leq C\% - 0.2 \times (V\% + 0.55 \times Nb\%) \leq 2\% \text{ (by mass)} \quad (4).$$

6. The centrifugally cast composite roll according to claim 3, wherein said intermediate layer further comprises one or more of 0.5-10% by mass of Cr, 2% or less by mass of Ni, 10% or less by mass of Co, and 0.5% or less by mass of Ti and/or 0.5% or less by mass of Al.

7. The centrifugally cast composite roll according to claim 1, wherein at least part of V in said outer layer is substituted by Nb in an amount satisfying the following formulae 5:

$$11\% \leq V\% + 0.55 \times Nb\% \leq 40\% \text{ (by mass)} \quad (5).$$

8. The centrifugally cast composite roll according to claim 1, wherein said outer layer has a structure, in which the diameter of the maximum circle inscribed in a region containing no MC carbide particles having equivalent-circle diameters of 15 μm or more is not more than 150 μm.

9. The centrifugally cast composite roll according to claim 1, wherein said outer layer has a structure, in which an average distance between MC carbide particles having equivalent-circle diameters of 15 μm or more is 10-40 μm.

10. The centrifugally cast composite roll according to claim 1, wherein an average equivalent-circle diameter of MC carbide particles is 10-50 μm in said outer layer.

11. The centrifugally cast composite roll according to claim 1, wherein a ratio (B/A) of an average distance B between MC carbide particles having equivalent-circle diameters of 15 μm or more to an average equivalent-circle diameter A of the MC carbide particles is 2 or less in said outer layer.

12. The centrifugally cast composite roll according to claim 1, wherein the carbides of $M_2C$, $M_6C$ and $M_7C_3$ having equivalent-circle diameters of 1 μm or more are dispersed in a total amount of 0-5% by area in said outer layer.

* * * * *